United States Patent [19]
Fuse et al.

[11] Patent Number: 5,768,449
[45] Date of Patent: Jun. 16, 1998

[54] OPTICAL TRANSMISSION SYSTEM AND OPTICAL TRANSMISSION METHOD

[75] Inventors: Masaru Fuse, Toyonaka; Katsuyuki Fujito, Higashiosaka, both of Japan

[73] Assignee: Matsushita Electric Industrial Co., Ltd., Osaka-fu, Japan

[21] Appl. No.: 707,470

[22] Filed: Sep. 4, 1996

[30] Foreign Application Priority Data

Jan. 9, 1996 [JP] Japan .................................. 8-001445

[51] Int. Cl.⁶ .............................. G02F 1/01; H04B 10/04
[52] U.S. Cl. ...................... 385/1; 385/2; 385/8; 359/181; 359/182
[58] Field of Search ............................... 385/1–3, 8, 14; 359/181–188, 245

[56] References Cited

U.S. PATENT DOCUMENTS 5,383,046  1/1995  Tomofuji et al. .................. 359/176
5,515,199  5/1996  Farina ............................. 385/1

Primary Examiner—Rodney B. Bovernick
Assistant Examiner—Hemang Sanghavi
Attorney, Agent, or Firm—Wenderoth, Lind & Ponack

[57] ABSTRACT

When an electric signal outputted from a signal source (101) is converted to a light signal in an electrica-optical converting portion (104), a distortion component such as secondary or tertiary distortion is caused in the light signal to deteriorate transmission quality. Therefore, the light signal outputted from the electrica-optical converting portion (104) is further intensity-modulated with the same electric signal in an external light modulation portion (106) to forcibly cause a distortion which is out of phase with and of the same amplitude as the distortion component caused in the electrical-optical converting portion (104), thereby canceling the distortion component included in the light signal. Consequently, an optical transmission system capable of high-quality optical transmitting can be realized while employing a device having equivalent performance with the conventional devices.

31 Claims, 8 Drawing Sheets

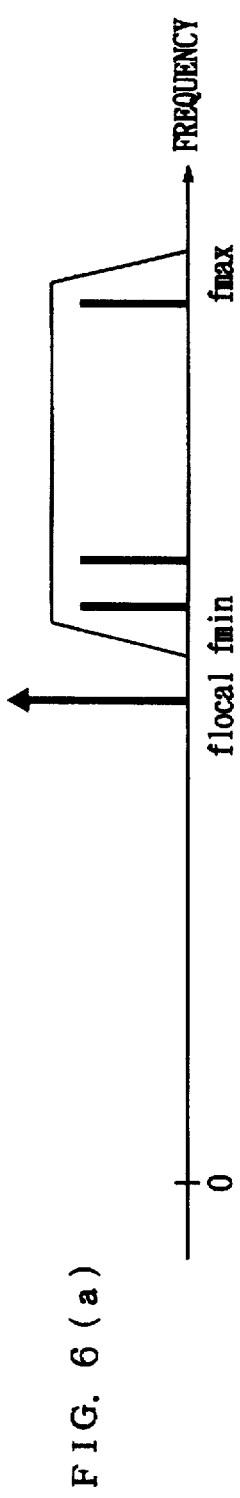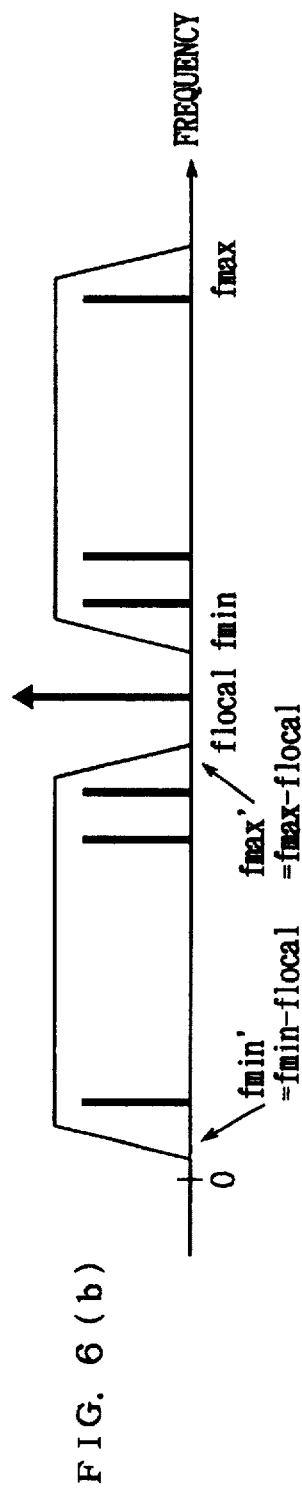
FIG. 6(a) ELECTRIC SIGNAL SPECTRUM OF INPUT LIGHT SIGNAL IN SECOND EXTERNAL LIGHT MODULATION PORTION
FIG. 6(b) ELECTRIC SIGNAL SPECTRUM OF OUTPUT LIGHT SIGNAL FROM SECOND EXTERNAL LIGHT MODULATION PORTION

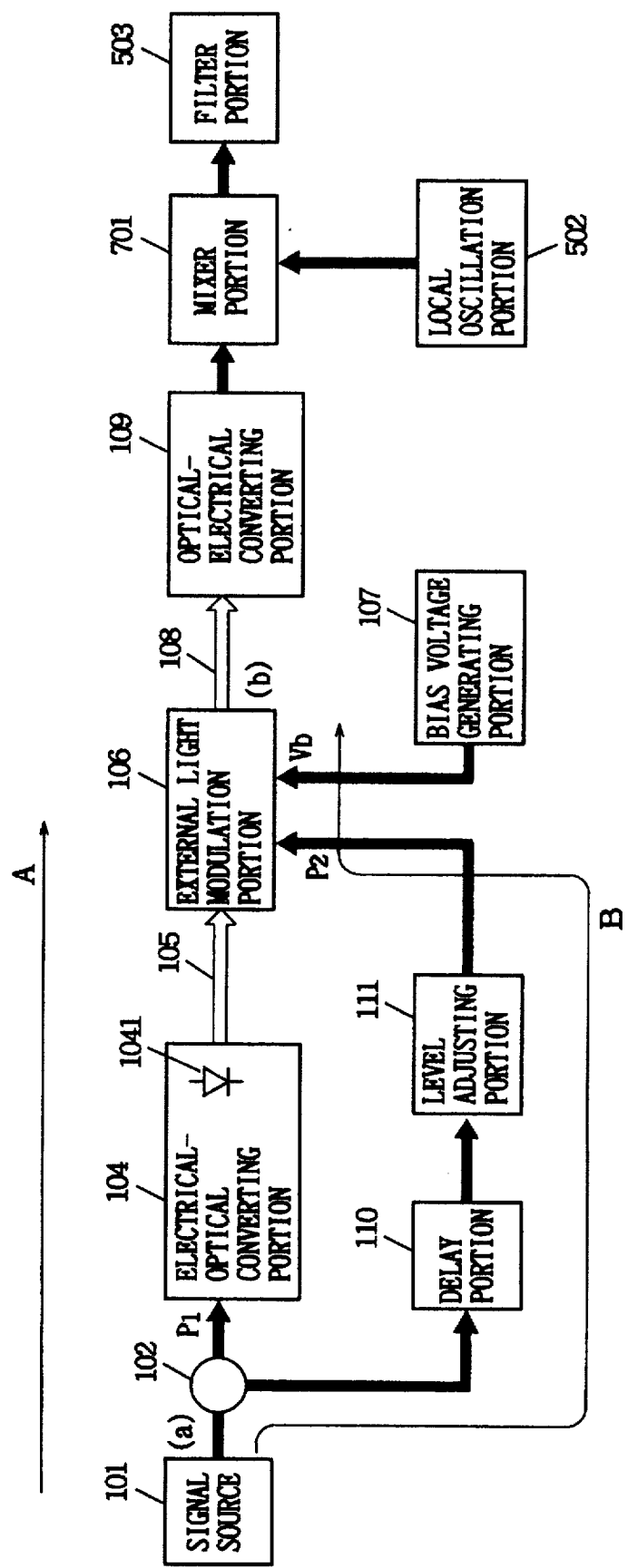

OPTICAL TRANSMISSION SYSTEM AND OPTICAL TRANSMISSION METHOD

BACKGROUND OF THE INVENTION

1. Field of the Invention

The present invention relates to an optical transmission system, and more specifically, the present invention relates to an analog optical transmission system for converting an electric signal to an intensity-modulated light signal and transmitting the same.

2. Description of the Background Art

FIG. 8 is a block diagram showing the structure of a conventional optical transmission system. Referring to FIG. 8, this optical transmission system comprises a signal source 801, an electrical-optical converting portion 804, an optical transmission path 805, and an optical-electrical converting portion 808. The electrical-optical converting portion 804 includes a light source 8041.

In the optical transmission system having the aforementioned structure, the signal source 801 outputs an electric signal to be optically transmitted. The electrical-optical converting portion 804 converts this electric signal to an intensity-modulated light signal, and transmits the same through the optical transmission path 805. The optical-electrical converting portion 808 re-converts the transmitted light signal to an electric signal.

The electrical-optical converting portion 804 converts the electric signal to the light signal typically by a direct light modulation system shown in FIG. 9, or an external light modulation system shown in FIG. 10. In the direct light modulation system shown in FIG. 9, the light source portion 8041 is prepared from a semiconductor laser or the like so that its injection current is amplitude-modulated with the aforementioned electric signal, thereby outputting an intensity-modulated light signal. In the external light modulation system shown in FIG. 10, on the other hand, an unmodulated light from the light source 8041 is inputted in an external light modulator 8042 and a voltage supplied with the external light modulator 8042 is amplitude-modulated with the aforementioned electric signal under a condition of a prescribed bias voltage ($V_b$) decided by a bias voltage adjusting portion 807, thereby outputting the intensity-modulated light signal.

In the aforementioned conventional optical transmission system, nonlinearity in the relation between the input signal (electric signal) and the output signal (light signal) in the electrical-optical converting portion 804 remarkably comes into question. Assuming that an input/output transfer function F(x) in the electrical-optical converting portion 804 is expressed as follows:

$$F(x)=a+bx+cx^2+dx^3$$

as shown in FIG. 11 (in case of the direct light modulation system) or FIG. 12 (at an operating point P in case of the external light modulation system), a secondary distortion is remarkably caused as a secondary coefficient c is increased, while a tertiary distortion is remarkably caused as a tertiary coefficient d is increased.

When an electric signal of a frequency f is converted to a light signal, for example, a double harmonic of a frequency 2f or a triple harmonic of a frequency 3f is caused as the secondary or tertiary distortion. Further, electrical-optical conversion of a frequency division multiplexing signal formed by multiplexing a plurality of signals having different frequencies results in a secondary intermodulation distortion (IM2) or CSO which is composite distortion thereof, or a tertiary intermodulation distortion (IM3) or CTB which is a composite distortion thereof Such distortion remarkably deteriorates the transmission quality as jamming waves for carrier waves portionicularly in case of analog transmission.

From such a viewpoint, it is necessary to reduce the absolute values of the secondary and higher coefficients (c, d, ...) of the transfer function F(x), i.e., to improve linearity of the electrical-optical converting portion 804, in order to perform high-quality optical transmission with small distortion. Therefore, in the direct light modulation system, a DFB (distributed feedback) laser having excellent linearity is employed as a light source and a study is now being made on the improvement of its performance. In the external light modulation system, on the other hand, the bias voltage ($V_b$) for the external light modulator having input/output characteristics shown in FIG. 12 is optimally set in a region (point P or Q) exhibiting the best linearity. However, the external light modulator is generally inferior in the linearity to the DFB laser even under such an operating condition, and hence an effort is now being made to improve the linearity in the electrical-optical conversion through a distortion compensation technique such as predistortion. In case of transmitting a frequency division multiplexing signal in analog SCM (sub-carrier multiplex) transmission, the tertiary distortion is often caused on the same frequency as the signal to be transmitted due to a frequency arrangement. In the analog SCM transmission, therefore, it is necessary particularly to reduce the tertiary distortion over the secondary distortion.

Generally, in the optical transmission system, nonlinearity in the electrical-optical converting portion 804 deteriorates the transmission quality as hereinabove described, and hence it is desired to improve the linearity of the electrical-optical converting portion 804. However, such improvement of the linearity in the electrical-optical converting portion 804 considerably depends on the device as described above, and it is generally difficult to improve the characteristics of the device. Further, dispersion of the characteristics of individual devices also comes into question, and hence it is difficult to further improve the linearity in the electrical-optical converting portion in the conventional optical transmission system. If the DFB laser having the excellent linearity is employed as the light source for the electrical-optical converting portion, the cost for the system is disadvantageously increased due to the high cost of the DFB laser.

SUMMARY OF THE INVENTION

Accordingly, an object of the present invention is to provide an optical transmission system which can reduce a distortion caused in an electrical-optical converting portion while employing an optical device of equivalent performance with the conventional system, thereby making a high-quality optical transmission.

The structures of the present invention for attaining the aforementioned object are now described with reference numerals for corresponding portions of elements employed in the present invention in order to clarify a corresponding relationship between the structures and aftermentioned each embodiment. However, it is previously pointed out that these reference numerals are simply employed for facilitating easy understanding and for the purpose of reference, and do not limit claims of the present invention.

According to a first aspect of the present invention, an optical transmission system for converting an electric signal to a light signal and transmitting the same comprises:

a signal source (101) for outputting the electric signal, a branch portion (102) for branching the electric signal into two electric signals, an electrical-optical converting portion (104) for converting a first modulation signal, which is one of the two electric signals branched in the branch portion, to an intensity-modulated light signal and outputting the same.

a first optical transmission path (105) for transmitting the light signal outputted from the electrical-optical converting portion, a delay portion (110) for providing a second modulation signal, which is the other one of the two signals branched in the branch portion, with a prescribed quantity of time delay, an external light modulation portion (106) operating in a state supplied with a prescribed bias voltage for intensity-modulating the light signal transmitted through the first optical transmission path in accordance with the value of the second modulation signal outputted from the delay portion, a second optical transmission path (108) for transmitting the light signal outputted from the external light modulation portion, and an optical-electrical converting portion (109) for re-converting the light signal transmitted through the second optical transmission path to an electric signal.

When the electric signal obtained from the signal source is converted to a light signal in the electrical-optical converting portion, a distortion component is caused in the light signal to deteriorate the transmission quality. According to the aforementioned first aspect, therefore, the light signal outputted from the electrical-optical converting portion is further intensity-modulated with the same electric signal in the external light modulation portion for forcibly causing a distortion which is out of phase with and of the same amplitude as the distortion component caused in the electrical-optical converting portion, thereby canceling the distortion component included in the light signal. Consequently, it is possible to implement an optical transmission system which can make the high-quality optical transmission while employing a device of equivalent performance with conventional devices.

According to a second aspect of the present invention, the optical transmission system according to the first aspect further comprises:

a local oscillation portion (502) for outputting a signal at a prescribed frequency, a second external light modulation portion (501) for intensity-modulating the light signal transmitted through the second optical transmission path in accordance with the value of the signal outputted from the local oscillation portion and outputting the same to the optical-electrical converting portion, and a filter portion (503) for passing only a prescribed frequency component in the electric signal outputted from the optical-electrical converting portion.

According to the second aspect, as hereinabove described, the transmission signal is down-converted on the receiving side immediately before the light signal is converted to the electric signal. Thus, it is possible to avoid a cost increase resulting from high frequency of the receiving circuit, and a larger number of carrier waves can be transmitted by setting the transmission frequency band in a higher region.

According to a third aspect of the present invention, the optical transmission system according to the first aspect further comprises:

a local oscillation portion (502) for outputting a signal of a prescribed frequency, a mixer portion (701) for mixing the electric signal outputted from the optical-electrical converting portion with the signal outputted from the local oscillation portion, and a filter portion (503) for passing only a prescribed frequency component in an electric signal outputted from the mixer portion.

According to the third aspect, as hereinabove described, the transmission signal is down-converted on the receiving side immediately after the light signal is converted to the electric signal. Thus, it is possible to avoid the cost increase resulting from the high frequency of the receiving circuit, and a larger number of carrier waves can be transmitted by setting the transmission frequency band in a higher region.

According to a fourth aspect of the present invention, the optical transmission system according to any of the first to third aspects is characterized in that:

when a delay quantity $DL_1$ of a signal propagation path starting with the signal source and leading to the second optical transmission path through the branch portion, the electrical-optical converting portion, the first optical transmission path and the external light modulation portion and a delay quantity $DL_2$ of a signal propagation path starting with the signal source and leading to the second optical transmission path through the branch portion, the delay portion and the external light modulation portion are set to be equal to each other, an input/output transfer function $F_1(x)$ describing a relation between the input electric signal (the first modulation signal) and the output light signal in the electrical-optical converting portion is expressed as follows:

$$F_1(x) = a_1 + b_1 x + c_1 x^2 + d_1 x^3_1,$$

an input/output transfer function $F_2(x)$ describing a relation between the input electric signal (the second modulation signal) and the output light signal in the external light modulation portion in the state of being supplied with the prescribed bias voltage is expressed as follows:

$$F_2(x) = a_2 + b_2 x + c_2 x^2 + d_2 x^3, \text{ and}$$

a ratio of a level $P_1$ of the first modulation signal to a level $P_2$ of the second modulation signal is expressed as follows:

$$P_1 : P_2 = 1 : m,$$

the levels $P_1$ and $P_2$ of the first and second modulation signals and the bias voltage supplied with the external light modulation portion are set so that the "m" and, coefficients of the input/output transfer functions $F_1(x)$ and $F_2(x)$ satisfy a relation expressed as follows:

$$a_1 + d_2 m^3 + b_1 c_2 m^2 + c_1 b_2 m + d_1 a_2 = 0.$$

According to the fourth aspect, as hereinabove described, the delay quantities $DL_1$ and $DL_2$ of the transmission paths for the first and second modulation signals are set to be equal to each other. In this case, it is possible to reduce the tertiary distortion included in the light signal by setting the levels $P_1$ and $P_2$ of the first and second modulation signals and the bias voltage supplied with the external light modulation portion at proper values so that the "m" and the coefficients of the input/output transfer functions $F_1(x)$ and $F_2(x)$ satisfy the relation expressed as follows:

$$a_1+d_2m^3+b_1c_2m^2+c_1b_2m+d_1a_2=0.$$

According to a fifth aspect of the present invention, the optical transmission system according to any of the first to third aspects is characterized in that:

when the delay quantity $DL_1$ of the signal propagation path starting with the signal source and leading to the second optical transmission path through the branch portion, the electrical-optical converting portion, the first optical transmission path and the external light modulation portion, and the delay quantity $DL_2$ of the signal propagation path starting with the signal source and leading to the second optical transmission path through the branch portion, the delay portion and the external light modulation portion set to be equal to each other, the input/output transfer function $F_1(x)$ describing the relation between the input electric signal (the first modulation signal) and the output light signal in the electrical-optical converting portion is expressed as follows:

$$F_1(x)=a_1+b_1x+c_1x^2+d_1x^3,$$

the input/output transfer function $F_2(x)$ describing the relation between the input electric signal (the second modulation signal) and the output signal in the external light modulation portion in the state of being supplied with the prescribed bias voltage is expressed as follows:

$$F_2(x)=a_2+b_2x, \text{ and}$$

the ratio of the level $P_1$ of the first modulation signal to the level $P_2$ of the second modulation signal is expressed as follows:

$$P_1:P_2=1:m,$$

the levels $P_1$ and $P_2$ of the first and second modulation signals and the bias voltage supplied with the external light modulation portion are set so that the "m" and, the coefficients of the input/output transfer functions $F_1(x)$ and $F_2(x)$ satisfy the relation expressed as follows:

$$c_1b_2m+d_1a_2=0 \text{ (or } m=-d_1a_2/c_1b_2).$$

According to the fifth aspect, as hereinabove described, the delay quantities $DL_1$ and $DL_2$ of the transmission paths for the first and second modulation signals are set to be equal to each other. Further, when linearity of the external light modulation portion is excellent or the degree of light modulation therein is small, whereby the input/output transfer function $F_2(x)$ is expressed as follows:

$$F_2(x)=a_2+b_2x,$$

In this case, it is possible to reduce the tertiary distortion included in the light signal by setting the levels $P_1$ and $P_2$ of the first and second modulation signals and the bias voltage applied to the external light modulation portion at proper values so that the "m" and the coefficients of the input/output transfer functions $F_1(x)$ and $F_2(x)$ satisfy the relation expressed as follows:

$$c_1b_2m+d_1a_2=0.$$

According to a sixth aspect of the present invention, the optical transmission system according to any of the first to third aspects is characterized in that:

when the delay quantity $DL_1$ of the signal propagation path starting with the signal source and leading to the second optical transmission path through the branch portion, the electrical-optical converting portion, the first optical transmission path and the external light modulation portion and the delay quantity $DL_2$ of the signal propagation path starting with the signal source and leading to the second optical transmission path through the branch portion, the delay portion and the external light modulation portion with reference to the signal source are different from each other, a frequency of the electric signal outputted from the signal source is represented by f, the input/output transfer function $F_1(x)$ describing the relation between the input electric signal (the first modulation signal) and the output light signal in the electrical-optical converting portion is expressed as follows:

$$F_1(x)=a_1+b_1x+c_1x^2+d_1x^3,$$

the input/output transfer function $F_2(x)$ describing the relation between the input electric signal (the second modulation signal) and the output signal in the external light modulation portion in the state of being supplied with the prescribed bias voltage is expressed as follows:

$$F_2(x)=a_2+b_2x+c_2x^2+d_2x^3, \text{ and}$$

the ratio of the level $P_1$ of the first modulation signal to the level $P_2$ of the second modulation signal is expressed as follows:

$$P_1:P_2=1:m,$$

the levels $P_1$ and $P_2$ of the first and second modulation signals, the time delay quantity in the delay portion and the bias voltage supplied with the external light modulation portion are set so that a difference $DL_x$ between the delay quantities $DL_1$ and $DL_2$, that is $DL_x=(DL_2-DL_1)$, the "m" and coefficients of input/output transfer functions $F_1(x)$ and $F_2(x)$ satisfy the relation expressed as follows:

$$a_1d_2m^3 \cdot \exp\{-3j \cdot 2\pi(DL_x \cdot f)\}$$
$$+b_1c_2m^2 \cdot \exp\{-2j \cdot 2\pi(DL_x \cdot f)\}$$
$$+c_1b_2m \cdot \exp\{-j \cdot 2\pi(DL_x \cdot f)\}$$
$$+d_1a_2=0.$$

According to the sixth aspect, as hereinabove described, the delay quantities $DL_1$ and $DL_2$ of the transmission paths for the first and second modulation signals are different from each other. In this case, it is possible to reduce the tertiary distortion included in the light signal by setting the levels $P_1$ and $P_2$ of the first and second modulation signals, the time delay quantity in the delay portion and the bias voltage applied to the external light modulation portion at proper values so that the difference $DL_x=(DL_2-DL_1)$ between the delay quantities $DL_1$ and $DL_2$, the "m" and the coefficients of the input/output transfer functions $F_1(x)$ and $F_2(x)$ satisfy the relation expressed as follows:

$$a_1d_2m^3 \cdot \exp\{-3j \cdot 2\pi(DL_x \cdot f)\}$$
$$+b_1c_2m^2 \cdot \exp\{-2j \cdot 2\pi(DL_x \cdot f)\}$$
$$+c_1b_2m \cdot \exp\{-j \cdot 2\pi(DL_x \cdot f)\}$$
$$+d_1a_2=0.$$

According to a seventh aspect of the present invention, the optical transmission system according to any of the first to third aspects is characterized in that:

when the delay quantity $DL_1$ of the signal propagation path starting with the signal source and leading to the second optical transmission path through the branch portion, the electrical-optical converting portion, the first optical transmission path and the external light modulation portion and the delay quantity $DL_2$ of the signal propagation path starting with the signal source and leading to the second optical transmission path through the branch portion, the delay portion and the external light modulation portion are different from each other, the frequency of the electric signal outputted from the signal source is represented by f, the input/output transfer function $F_1(x)$ describing the relation between the input electric signal (the first modulation signal) and the output light signal in the electrical-optical converting portion is expressed as follows:

$$F_1(x)=a_1+b_1x+c_1x^2+d_1x^3,$$

the input/output transfer function $F_2(x)$ describing the relation between the input electric signal (the second modulation signal) and the output signal in the external light modulation portion in the state of being supplied with the prescribed bias voltage is expressed as follows:

$$F_2(x)=a_2+b_2x, \text{ and}$$

the ratio of the level $P_1$ of the first modulation signal to the level $P_2$ of the second modulation signal is expressed as follows:

$$P_1:P_2=1:m,$$

the levels $P_1$ and $P_2$ of the first and second modulation signals, the time delay quantity in the delay portion and the bias voltage supplied with the external light modulation portion are set so that the difference $DL_x$ between the delay quantities $DL_1$ and $DL_2$, that is $DL_x= (DL_2-DL_1)$ the "m" and coefficients of input/output transfer functions $F_1(x)$ and $F_2(x)$ satisfy the relation expressed as follows:

$$c_1b_2m \cdot \exp\{-j \cdot 2\pi(DL_x \cdot f)+d_1a_2\}=0.$$

According to the seventh aspect, as hereinabove described, the delay quantities $DL_1$ and $DL_2$ of the transmission paths for the first and second modulation signals are different from each other. Further, when linearity of the external light modulation portion is excellent or the degree of light modulation therein is small, the input/output transfer function $F_2$ of the external light modulation portion is expressed as follows:

$$F_2(x)=a_2+b_2x.$$

In this case, it is possible to reduce the tertiary distortion included in the light signal by setting the levels $P_1$ and $P_2$ of the first and second modulation signals, the time delay quantity in the delay portion and the bias voltage supplied with the external light modulation portion at proper values so that the "m" and the coefficients of the input/output transfer functions $F_1(x)$ and $F_2(x)$ satisfy the relation expressed as follows:

$$c_1b_2m+d_1a_2=0.$$

According to an eighth aspect of the present invention, the optical transmission system according to any of the first to third aspects is characterized in that:

when the delay quantity $DL_1$ of the signal propagation path starting with the signal source and leading to the second optical transmission path through the branch portion, the electrical-optical converting portion, the first optical transmission path and the external light modulation portion and the delay quantity $DL_2$ of the signal propagation path starting with the signal source and leading to the second optical transmission path through the branch portion, the delay portion and the external light modulation portion are set to be equal to each other, the input/output transfer function $F_1(x)$ describing the relation between the input electric signal (the first modulation signal) and the output light signal in the electrical-optical converting portion is expressed as follows:

$$F_1(x)=a_1+b_1x+c_1x^2+d_1x^3,$$

the input/output transfer function $F_2(x)$ describing the relation between the input electric singal (the second modulation signal) and the output signal in the external light moduolation portion in the state of being supplied with the prescribed bias voltage is expressed as follows:

$$F_2(x)=a_2+b_2x+c_2x^2+d_2x^3, \text{ and}$$

the ratio of the level $P_1$ of the first modulation signal to the level $P_2$ of the second modulation signal is expressed as follows:

$$P_1:P_2 =1:m,$$

the levels $P_1$ and $P_2$ of the first and second modulation signals, and the bias voltage supplied with the external light modulation portion are set so that the "m" and the coefficients of input/output transfer functions $F_1(x)$ and $F_2(x)$ satisfy theOO relation expressed as follows:

$$a_1c_2m^2+b_1b_2m+c_1a_2=0.$$

According to the eighth aspect, as hereinabove described, the delay quantities $DL_1$ and $DL_2$ of the transmission paths for the first and second modulation signals are set to be equal to each other. In this case, it is possible to reduce the secondary distortion included in the light signal by setting the levels $P_1$ and $P_2$ of the first and second modulation signals and the bias voltage applied to the external light modulation portion at proper values so that the "m" and the coefficients of the input/output transfer functions $F_1(x)$ and $F_2(x)$ satisfy the relation expressed as follows:

$$a_1c_2m^2+b_1b_2m+c_1a_2=0.$$

According to a ninth aspect of the present invention, the optical transmission system according to any of the first to third aspects is characterized in that:

when the delay quantity $DL_1$ of a signal propagation path starting with the signal source and leading to the second optical transmission path through the branch portion, the electrical-optical converting portion, the first optical transmission path and the external light modulation portion, and the delay quantity $DL_2$ of the signal propagation path starting with the signal source and leading to the second optical transmission path through the branch portion, the delay portion and the external light modulation portion are set to be equal to each other, the input/output transfer function $F_1(x)$ describing the relation between the input electric signal (the first modulation signal) and the output light signal in the electrical-optical converting portion is expressed as follows:

$$F_1(x)=a_1+b_1x+c_1x^2+d_1x^3,$$

the input/output transfer function $F_2(x)$ describing the relation between the input electric singal (the second modulation signal) and the output signal in the external light moduolation portion in the state of being supplied with the prescribed bias voltage is expressed as follows:

$$F_2(x)=a_2+b_2x, \text{ and}$$

the ratio of the level $P_1$ of the first modulation signal to the level $P_2$ of the second modulation signal is expressed as follows:

$$P_1:P_2=1:m,$$

the levels $P_1$ and $P_2$ of the first and second modulation signals, and the bias voltage supplied with the external light modulation portion are set so that the "m" and the coefficients of input/output transfer functions $F_1(x)$ and $F_2(x)$ satisfy the relation expressed as follows:

$$b_1b_2m+c_1a_2=0 \text{ (or } m=c_1a_2/b_1b_2).$$

According to the ninth aspect, as hereinabove described, the delay quantities $DL_1$ and $DL_2$ of the transmission paths for the first and second modulation signals are set to be equal to each other. Further, when linearity of the external light modulation portion is excellent or the degree of light modulation therein is small, the input/output transfer function $F_2(x)$ of the external light modulation portion is expressed as follows:

$$F_2(x)=a_2+b_2x.$$

In this case, it is possible to reduce the secondary distortion included in the light signal by setting the levels $P_1$ and $P_2$ of the first and second modulation signals and the bias voltage supplied with the external light modulation portion at proper values so that the "m" and the coefficients of the input/output transfer functions $F_1(x)$ and $F_2(x)$ satisfy the relation expressed as follows:

$$b_1b_2m+c_1a_2=0.$$

According to a tenth aspect of the present invention, the optical transmission system according to any of the first to third aspects is characterized in that:

when the delay quantity $DL_1$ of a signal propagation path starting with the signal source and leading to the second optical transmission path through the branch portion, the electrical-optical converting portion, the first optical transmission path and the external light modulation portion, and the delay quantity $DL_2$ of the signal propagation path starting with the signal source and leading to the second optical transmission path through the branch portion, the delay portion and the external light modulation portion are different from each other, the frequency of the electric signal outputted fromthe signal source is represented by f, the input/output transfer function $F_1(x)$ describing the relation between the input electric signal (the first modulation signal) and the output light signal in the electrical-optical converting portion is expressed as follows:

$$F_1(x)=a_1+b_1x+c_1x^2+d_1x^3$$

the input/output transfer function $F_2(x)$ describing the relation between the input electric singal (the second modulation signal) and the output signal in the external light moduolation portion in the state of being supplied with the prescribed bias voltage is expressed as follows:

$$F_2(x)=a_2+b_2x+c_2x^2+d_2x^3, \text{ and}$$

the ratio of the level $P_1$ of the first modulation signal to the level $P_2$ of the second modulation signal is expressed as follows:

$$P_1:P_2=1:m,$$

the levels $P_1$ and $P_2$ of the first and second modulation signals, the time delay quantity in the delay portion and the bias voltage supplied with the external light modulation portion are set so that the difference $DL_x$ between the delay quantities $DL_1$ and $DL_2$, that is $DL_x=(DL_2-DL_1)$, the "m" and coefficients of the input/output transfer functions $F_1(x)$ and $F_2(x)$ satisfy the relation expressed as follows:

$$a_1c_2m^2 \cdot \exp\{-2j \cdot 2\pi(DL_x \cdot f)\}$$
$$+b_1b_2m \cdot \exp\{-j \cdot 2\pi(DL_x \cdot f)\}+c_1a_2=0.$$

According to the tenth aspect, as hereinabove described, the delay quantities $DL_1$ and $DL_2$ of the transmission paths for the first and second modulation signals are different from each other. In this case, it is possible to reduce the secondary distortion included in the light signal by setting the levels $P_1$ and $P_2$ of the first and second modulation signals, the time delay quantity in the delay portion and the bias voltage supplied with the external light modulation portion at proper values so that the difference $DL_x=(DL_2-DL_1)$ between the delay quantities $DL_1$ and $DL_2$, the "m" and the coefficients of the input/output transfer functions $F_1(x)$ and $F_2(x)$ satisfy the relation expressed as follows:

$$a_1c_2m^2 \cdot \exp\{-2j \cdot 2\pi(DL_x \cdot f)\}$$
$$+b_1b_2m \cdot \exp\{-j \cdot 2\pi(DL_x \cdot f)\}+c_1a_2=0.$$

According to an eleventh aspect of the present invention, the optical transmission system according to any of the first to third aspects is characterized in that:

when the delay quantity $DL_1$ of the signal propagation path starting with the signal source and leading to the second optical transmission path through the branch portion, the electrical-optical converting portion, the first optical transmission path and the external light modulation portion, and the delay quantity $DL_2$ of the signal propagation path starting with the signal source and leading to the second optical transmission path through the branch portion, the delay portion and the external light modulation portion are different from each other, the frequency of the electric signal outputted from the signal source is represented by f, the input/output transfer function $F_1(x)$ describing the relation between the input electric signal (the first modulation signal) and the output light signal in the electrical-optical converting portion is expressed as follows:

$$F_1(x)=a_1+b_1x+c_1x^2+d_1x^3,$$

the input/output transfer function $F_2(x)$ describing the relation between the input electric singal (the second modulation signal) and the output signal in the external light moduolation portion in the state of being supplied with the prescribed bias voltage is expressed as follows:

$$F_2(x)=a_2+b_2x, \text{ and}$$

the ratio of the level $P_1$ of the first modulation signal to the level $P_2$ of the second modulation signal is expressed as follows:

$$P_1:P_2 =1:m,$$

the levels $P_1$ and $P_2$ of the first and second modulation signals, the time delay quantity in the delay portion and the bias voltage supplied with the external light modulation portion are set so that the difference $DL_x$ between the delay quantities $DL_1$ and $DL_2$, that is $DL_x = (DL_2-DL_1)$, the "m" and coefficients of the input/output transfer functions $F_1(x)$ and $F_2(x)$ satisfy the relation expressed as follows:

$$b_1b_2m\cdot\exp\{-j\cdot 2\pi(DL_x\cdot f)\}+c_1a_2=0.$$

According to the eleventh aspect, as hereinabove described, the delay quantities $DL_1$ and $DL_2$ of the transmission paths for the first and second modulation signals are different from each other. Further, when the linearity of the external light modulation portion is excellent or the degree of light modulation therein is small, the input/output transfer function $F_2$ of the external light modulation portion is expressed as follows:

$$F_2(x)=a_2+b_2x.$$

In this case, it is possible to reduce the secondary distortion included in the light signal by setting the levels $P_1$ and $P_2$ of the first and second modulation signals, the time delay quantity in the delay portion and the bias voltage applied to the external light modulation portion at proper values so that the "m" and the coefficients of the input/output transfer functions $F_1(x)$ and $F_2(x)$ satisfy the relation expressed as follows:

$$b_1b_2m\cdot\exp\{-j2\pi(DL_x\cdot f)\}+c_1a_2=0.$$

According to a twelfth aspect of the present invention, the optical transmission system according to the second or third aspect is characterized in that:

when the electric signal outputted from the signal source is a frequency division multiplexing signal formed by multiplexing a plurality of carrier waves of different frequencies, a maximum frequency $f_{max}$ and a minimum frequency $f_{min}$ are set to satisfy:

$$f_{max}<2\cdot f_{min}$$

in the overall band of this frequency division multiplexing signal, and the maximum frequency $f_{max}$ and minimum frequency $f_{min}$ in the overall band of the frequency division multiplexing signal and a frequency $f_{local}$ of the output signal from the local oscillation portion are set to satisfy:

$$f_{min}>f_{local}>f_{max}-f_{min}.$$

the delay quantity $DL_1$ of the signal propagation path starting with the signal source and leading to the second optical transmission path through the branch portion, the electrical-optical converting portion, the first optical transmission path and the external light modulation portion, and the delay quantity $DL_2$ of the signal propagation path starting with the signal source and leading to the second optical transmission path through the branch portion, the delay portion and the external light modulation portion are set to be equal to each other;

the input/output transfer function $F_1(x)$ describing the relation between the input electric signal (the first modulation signal) and the output light signal in the electrical-optical converting portion is expressed as follows:

$$F_1(x)=a_1+b_1x+C_1x^2+d_1x^3,$$

the input/output transfer function $F_2(x)$ describing the relation between the input electric singal (the second modulation signal) and the output light signal in the external light moduolation portion in the state of being supplied with the prescribed bias voltage is expressed as follows:

$$F_2(x)=a_2+b_2x+c_2x^2+d_2x^3, \text{ and}$$

the ratio of the level $P_1$ of the first modulation signal to the level $P_2$ of the second modulation signal is expressed as follows:

$$P_1:P_2=1:m,$$

the levels $P_1$ and $P_2$ of the first and second modulation signals, and the bias voltage supplied with the external light modulation portion are set so that the "m" and coefficients of the input/output transfer functions $F_1(x)$ and $F_2(x)$ satisfy the relation expressed as follows:

$$a_1d_2m^3+b_1c_2m^2+c_1b_2m+d_1a_2=0, \text{ and}$$

the filter portion passes only a frequency component lower than the frequency $f_{local}$.

According to a thirteenth aspect of the present invention, the optical transmission system according to the second or third aspect is characterized in that:

when the electric signal outputted from the signal source is the frequency division multiplexing signal formed by multiplexing the plurality of carrier waves of different frequencies, the maximum frequency $f_{max}$ and the minimum frequency $f_{min}$ are set to satisfy:

$$f_{max}<2\cdot f_{min}$$

in the overall band of this frequency division multiplexing signal, and the maximum frequency $f_{max}$ and minimum frequency $f_{min}$ in the overall band of the frequency division multiplexing signal and the frequency $f_{local}$ of the output signal in the local oscillation portion are set to satisfy:

$$f_{min} > f_{local} > f_{max} - f_{min},$$

the delay quantity $DL_1$ of the signal propagation path starting with the signal source and leading to the second optical transmission path through the branch portion, the electrical-optical converting portion, the first optical transmission path and the external light modulation portion, and the delay quantity $DL_2$ of the signal propagation path ,arting with the signal source and leading to the second optical transmission path through the branch portion, the delay portion and the external light modulation portion are set to be equal to each other, the input/output transfer function $F_1(x)$ describing the relation between the input electric signal (the first modulation signal) and the output light signal in the electrical-optical converting portion is expressed as follows:

$$F_1(x) = a_1 + b_1 x + c_1 x^2 + d_1 x^3,$$

the input/output transfer function $F_2(x)$ describing the relation between the input electric singal (the second modulation signal) and the output light signal in the external light moduolation portion in the state of being supplied with the prescribed bias voltage is expressed as follows:

$$F_2(x) = a_2 + b_2 x, \text{ and}$$

the ratio of the level $P_1$ of the first modulation signal to the level $P_2$ of the second modulation signal is expressed as follows:

$$P_1 : P_2 = 1 : m,$$

the levels $P_1$ and $P_2$ of the first and second modulation signals, and the bias voltage supplied with the external light modulation portion are set so that the "m" and, the coefficients of the input/output transfer functions $F_1(x)$ and $F_2(x)$ satisfy a relation expressed as follows:

$$c_1 b_2 m + d_1 a_2 = 0, \text{ and}$$

the filter portion passes only the frequency component lower than the frequency $f_{local}$.

In each of the aforementioned twelth to thirteenth aspects of the present invention, the transmission band $(f_{max} - f_{min})$ of the transmission signal is limited in the so-called single octave. Therefore, the secondary distortion is caused only in the exterior of the transmission band, so that no secondary distortion is caused in the transmission band. According to each of the twelfth to thirteenth aspects, therefore, the tertiary distortion is positively reduced by optimally setting the levels $P_1$ and $P_2$ and the first and second modulation signals and the bias voltage supplied with the external light modulation portion. When the transmisison band for the transmission signal is limited in the single octave, however, it is necessary to set the transmission frequency band in a high region in order to transmit a number of carrier waves. In this case, the high frequency of the receiving circuit inreases the cost. In each of the twelfth to thirteenth aspects, therefore, the transmission signal is down-converted immediately before or after the light signal is converted to the electric signal, thereby avoiding the cost increase of the receiving circuit resulting from the high frequency.

According to a fourteenth aspect of the present invention, an optical transmission method of converting an electric signal to a light signal and transmitting the same comprises the steps of:

converting the electric signal to an intensity-modulated first light signal;

intensity-modulating the first light signal with the electric signal again using an external light modulation system, thereby acquiring a second light signal with a distortion component canceled; and transmitting the second light signal through an optical transmission path.

According to the fourteenth aspect of the present invention, the light signal which is intensity-modulated with the electric signal is further intensity-modulated with the same electric signal thereby canceling the distortion component included in the light signal, similarly to the first aspect.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 6 illustrates frequency arrangement of a modulation signal according to the sixth embodiment of the present invention;

FIG. 7 is a block diagram showing the structure of an optical transmission system according to a seventh embodiment of the present invention;

DESCRIPTION OF THE PREFERRED EMBODIMENTS

(1) First Embodiment

Figure 1:
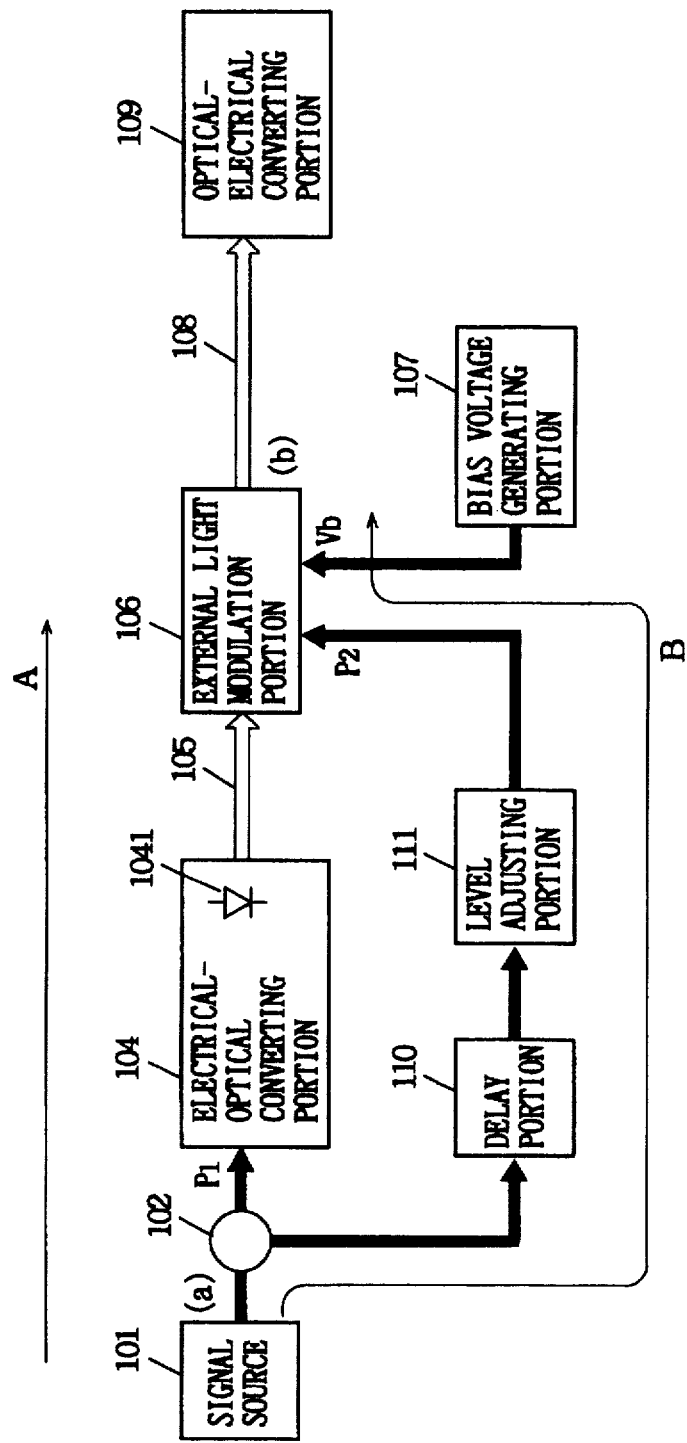
FIG. 1 is a block diagram showing the structure of an optical transmission system according to each of first to fifth embodiments of the present invention.

FIG. 1 is a block diagram showing the structure of an optical transmission system according to a first embodiment of the present invention. Referring to FIG. 1, the optical transmission system according to this embodiment includes a signal source 101, a branch portion 102, an electrical-optical converting portion 104, a first optical transmission path 105, an external light modulation portion 106, a bias voltage generating portion 107, a second optical transmission path 108, an optical-electical converting portion 109, a delay portion 110, and a level adjusting portion 111. The electrical-optical converting portion 104 includes a light source 1041.

The operation of the first embodiment having the aforementioned structure is now described.

Figure 9:
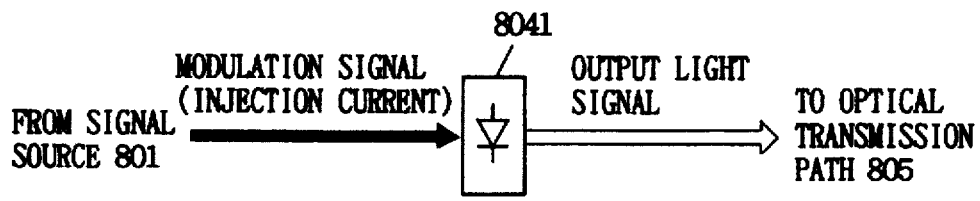
FIG. 9 is a block diagram for illustrating a concrete structure of an electrical-optical converting portion employing a direct light modulation system.
Figure 10:
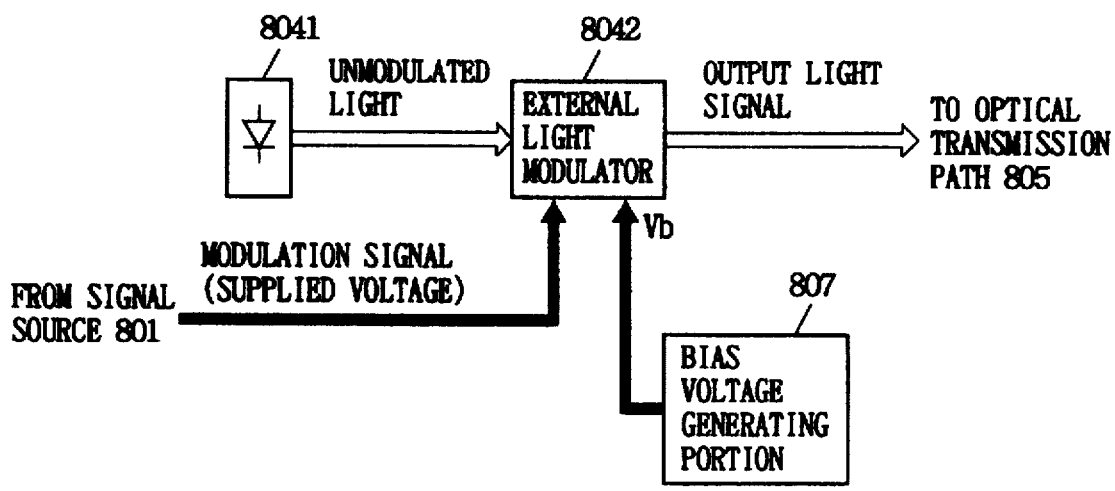
FIG. 10 is a block diagram for illustrating a concrete structure of an electrical-optical converting portion employing an external light modulation system.
Figure 11:
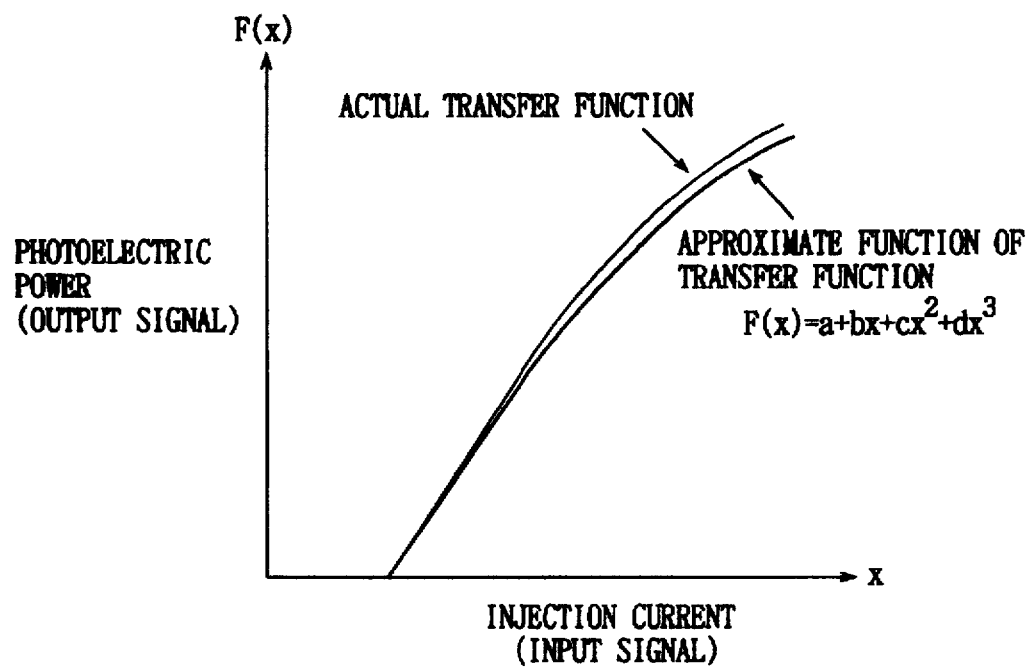
FIG. 11 is adapted to illustrate nonlinearity of an input/output transmission function of an electrical-optical converting portion employing the direct light modulation system.
Figure 12:
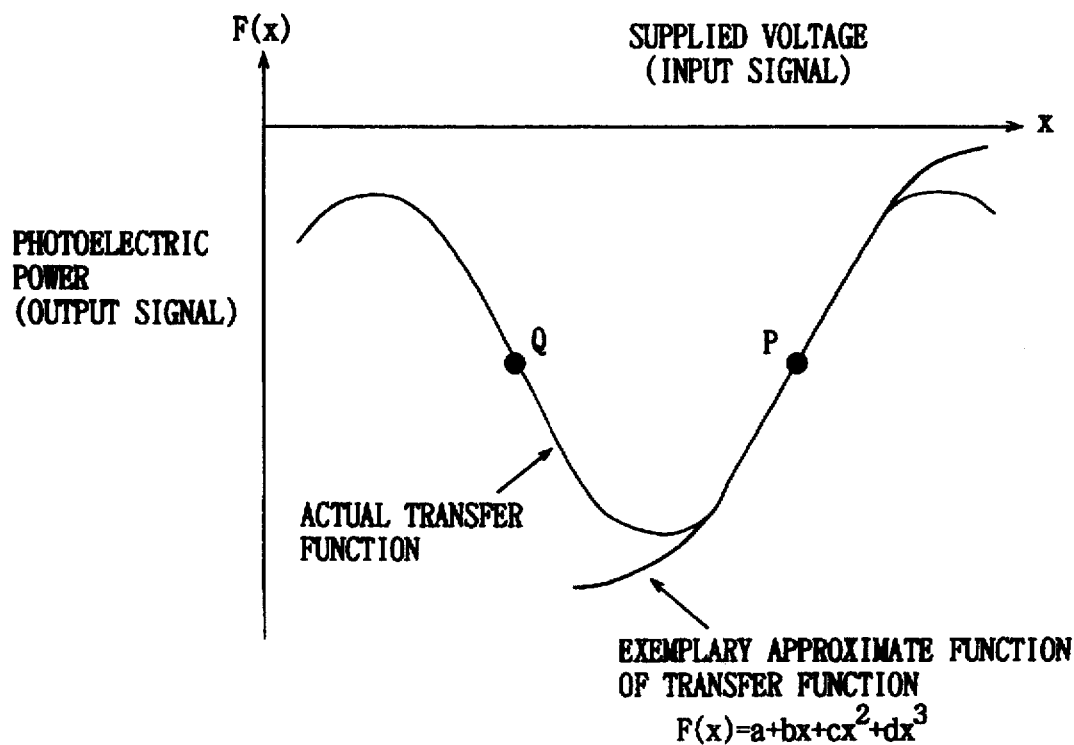
FIG. 12 is adapted to illustrate nonlinearity of an input/output transmission function of an electrical-optical converting portion employing the external light modulation system.

The signal source 101 outputs a sine wave of a frequency f, for example, as an electric signal to be transmitted. The branch portion 102 branches the electric signal into two signals, for inputting the first signal (hereinafter referred to as a first modulation signal) in the electrical-optical converting portion 104 while inputting the second signal (hereinafter referred to as a second modulation signal) in the delay portion 110. The delay portion 110 provides the inputted electric signal with a prescribed quantity of delay, and thereafter outputs the same. The electrical-optical converting portion 104 employing a direct modulation system which is similar to that shown in FIG. 9 comprises the light source 1041, for converting the first modulation signal of a prescribed level $P_1$ outputted from the branch portion 102 to an intensity-modulated light signal and outputting the same. This light signal is inputted in the external light modulation portion 106 through the first optical transmission path 105. The level adjusting portion 111 adjusts the level of the electric signal outputted from the delay portion 110 to a prescribed level $P_2$, and then supplies with this signal to the external light modulation portion 106 as a modulation signal. The external light modulation portion 10 employing an external modulation system which is similar to that shown in FIG. 10 operates under a condition of a prescribed bias voltage ($V_b$) supplied from the bias voltage generating portion 107, performs light intensity modulation on the inputted light signal in response to the value of the second modulation signal, and thereafter outputs the signal to the second optical transmission path 108. The optical-electical converting portion 109 re-converts the light signal transmitted by the second optical transmission path 108 to an electric signal.

It is assumed that $DL_1$ represents the delay quantity (hereinafter referred to as a first delay quantity) of a signal propagation path A leading from an output terminal (a) of the signal source 101 to a light output end (b) of the external light modulation portion 106 through the branch portion 102, the electrical-optical converting portion 104 and the first optical transmission path 105, and $DL_2$ represents the delay quantity (hereinafter referred to as a second delay quantity) of a signal propagation path B leading from the output terminal (a) of the signal source 101 to the light output end (b) of the external light modulation portion 106 through the branch portion 102, the delay portion 110 and the level adjusting portion 111 respectively. Further, it is assumed that $P_1$ represents the level of the first modulation signal inputted in the electrical-optical converting portion 104 and $P_2$ represents the level of the second modulation signal inputted in the external light modulation portion 106 respectively, and the ratio therebetween is expressed as follows:

$$P_1:P_2=1:m.$$

Figure 2:
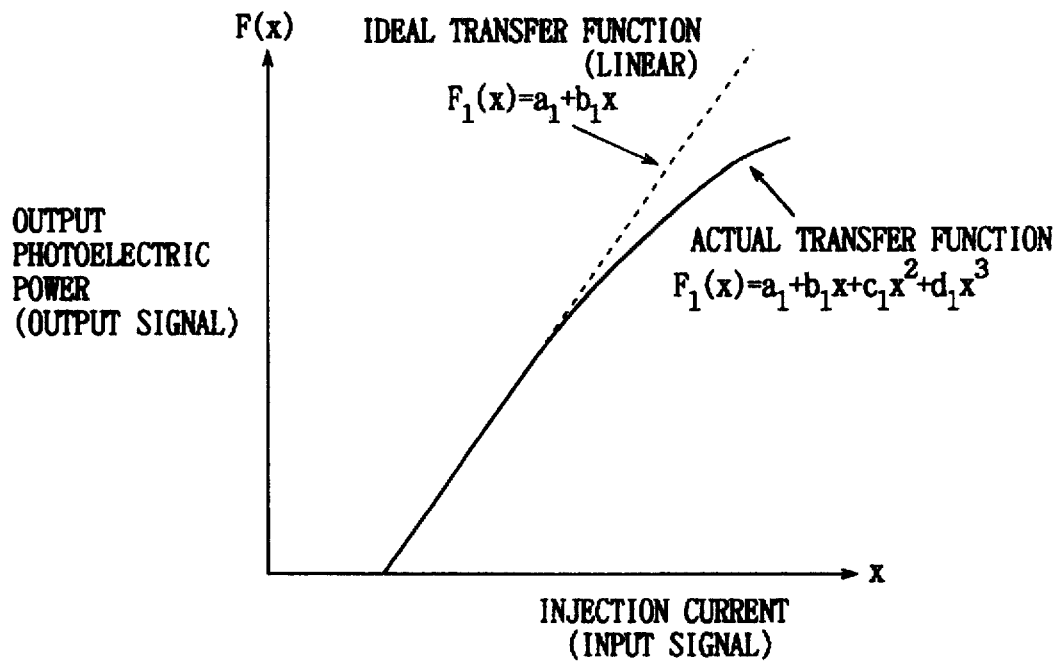
FIG. 2 is adapted to illustrate nonlinearity of an input/output transfer function of an electrical-optical converting portion 104 shown in FIG. 1.

As shown in FIG. 2, an input/output transfer function $F(x)$ of the electrical-optical converting portion 104 employing the direct light modulation system is approximately expressed in the following expression (1):

$$F_1(x)=a_1+b_1x+c_1x^2+d_1x^3 \tag{1}$$

Figure 3:
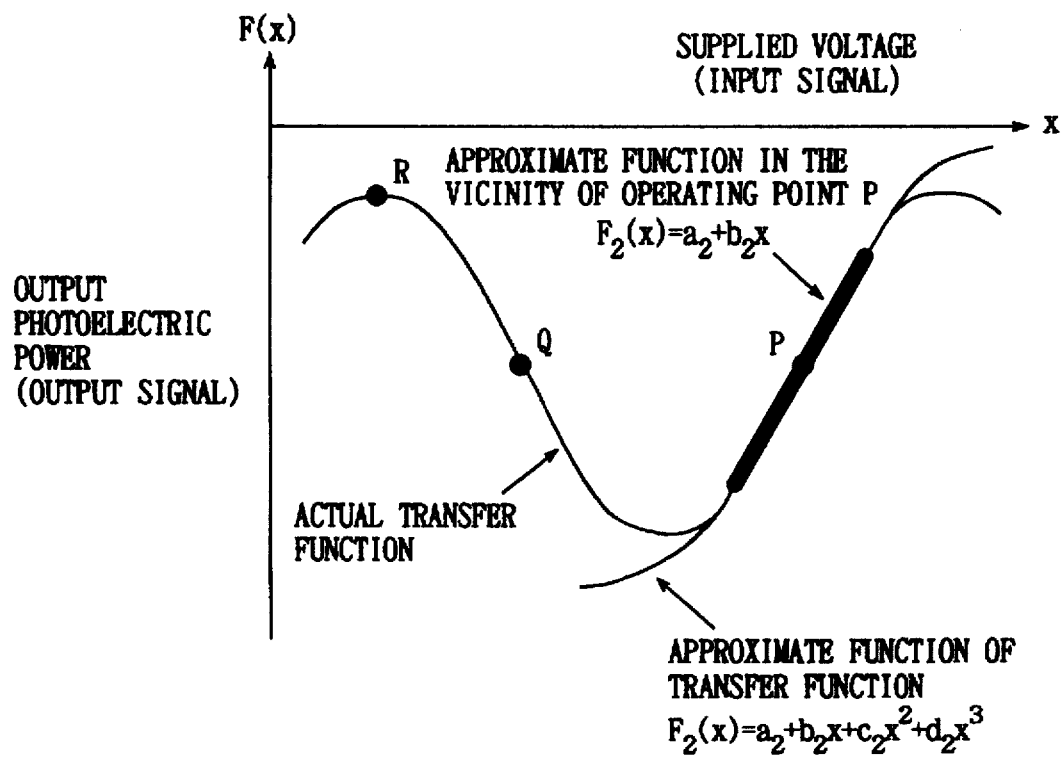
FIG. 3 is adapted to illustrate nonlinearity of an input/output transfer function of an external light modulation portion 106 shown in FIG. 1.

As shown in FIG. 3, an input/output transfer function $F_2(x)$ of the external light modulation portion 106 under the condition of the prescribed bias voltage ($V_b$) is approximately expressed in the following expression (2):

$$F_2(x)=a_2+b_2x+c_2x^2+d_2x^3 \tag{2}$$

In the input/output transfer function $F_2(x)$ of the external light modulation portion 106, the values of the coefficients vary with the condition of the supplied bias voltage, such that the sign of the primary coefficient $b_2$ is inverted at points P and Q, for example. When the bias voltage is set in proximity to a point R, a secondary characteristic appears strongly.

In the first embodiment, the delay quantity in the delay portion 110 is set so that the first and second delay quantities $DL_1$ and $DL_2$ are equal to each other, i.e., the transmission path lengths for the first and second modulation signals are equal to each other. Further, the level $P_2$ of the second modulation signal is adjusted in the level adjusting portion 111 so that the aforementioned "m" and the respective coefficients of the input/output transfer functions $F_1(x)$ and $F_2(x)$ satisfy the following relations:

In case of suppressing the tertiary distortion, the level adjusting portion 111 and the bias voltage generating portion 107 are set so as to satisfy the relation of the following expression (3):

$$a_1d_2m^3+b_1c_2m^2+c_1b_2m+d_1a_2=0 \tag{3}$$

In case of suppressing the secondary distortion, on the other hand, the level adjusting portion 111 and the bias voltage generating portion 107 are set so as to satisfy the relation of the following expression (4):

$$a_1+c_2m^2+b_1b_2m+c_1a_2=0 \tag{4}$$

When the respective input/output transfer functions $F_1(x)$ and $F_2(x)$ of the electrical-optical converting portion 104 employing the direct modulation system and the optical-alectical converting portion 106 employing the external modulation system are provided in the aforementioned manner and the first and second delay quantities $DL_1$ and $DL_2$ are set to be equal to each other, an input/output transfer function $F_{total}(x)$ of the system inputting the first modulation signal and outputting the light signal outgoing from the external light modulation portion 106 is expressed in the following expression (5):

$$F_{total}(x)=F_1(x) \cdot F_2(m \cdot x) \tag{5}$$

When $F_1(x)$ and $F_2(x)$ are expressed in the expressions (1) and (2) respectively, the above expression (5) is expanded as follows:

$$\begin{aligned}F(x)_{total} &= a_1a_2 \\ &+ (b_1a_2 + a_1b_2m)x \\ &+ (c_1a_2 + b_1b_2m + a_1c_2m^2)x^2\end{aligned} \tag{6}$$

-continued $$+ (d_1a_2 + c_1b_2m + b_1c_2m^2 + a_1d_2m^3)x^3$$
$$+ (d_1b_2m + c_1c_2m^2 + b_1d_2m^3)x^4$$
$$+ (d_1c_2m^2 + c_1d_2m^3)x^5$$
$$+ d_1d_2m^3x^6 \ldots (6)$$

No secondary distortion is caused if the secondary coefficient $q_2$ expressed as follows is "0" (i.e., if the condition of the above expression (4) is satisfied) in the above expression (6):

$$q_2 = c_1a_2 + b_1b_2m + a_1c_2m^2$$

No tertiary distortion is caused if the tertiary coefficient $q_3$ expressed as follows is "0" (i.e., if the condition of the above expression (3) is satisfied) in the above expression (6):

$$q_3 = d_1a_2 + c_1b_2m + b_1c_2m^2 + a_1d_2m^3$$

(2) Second Embodiment

The structure of a second embodiment is basically similar to that shown in FIG. 1. In the second embodiment, however, the external light modulation portion 106 which lenearity is excellent is employed, or the degree of light modulation therein is set to be small. According to the second embodiment, the input/output transfer function $F_2(x)$ of the external light modulation portion 106 is expressed in the following expression (7) in place of the above expression (2):

$$F_2(x) = a_2 + b_2x \quad (7)$$

The input/output transfer function $F_2(x)$ of the external light modulation portion 106 has excellent linearity in a bias voltage region (in the vicinity of the point P or Q in FIG. 3) where the external light modulation is generally employed, whereby the coefficients $c_2$ and $d_2$ in the expression (2) are small. Therefore, the input/output transfer function $F_2(x)$ of the external light modulation portion 106 is expressed in an approximate expression as in the above expression (7). The sign of the primary coefficient $b_2$ is inverted at the points P and Q.

In the second embodiment, further, the delay quantity in the delay portion 110 is set so that the first and second delay quantities $DL_1$ and $DL_2$ are equal to each other, i.e., the transmission path lengths for the first and second modulation signals are equal to each other, similarly to the first embodiment.

In case of suppressing tertiary distortion in the aforementioned second embodiment, the level adjusting portion 111 and the bias voltage generating portion 107 are set so as to satisfy the relation of the following expression (8):

$$c_1b_2m + d_1a_2 = 0 \quad (8)$$

In case of suppressing secondary distortion, on the other hand, the level adjusting portion 111 and the bias voltage generating portion 107 are set so as to satisfy the relation of the following expression (9)

$$b_1b_2m + c_1a_2 = 0 \quad (9)$$

When linearity of the external modulation portion 106 is excellent or the degree of light modulation therein is small, as described above, i.e., when the input/output transfer function $F_2(x)$ of the external modulation portion 106 is expressed in the expression (7), the input/output transfer function $F_{total}(x)$ of the system inputting the first modulation signal and outputting the light signal outgoing from the external light modulation portion 106 is as follows:

$$F_{total}(x) = a_1a_2 \quad (10)$$
$$+ (b_1a_2 + a_1b_2m)x$$
$$+ (c_1a_2 + b_1b_2m)x^2$$
$$+ (d_1a_2 + c_1b_2m)x^3$$
$$+ d_1b_2mx^4$$

No secondary distortion is caused if the secondary coefficient $q_2$ expressed as follows is "0" (i.e., if the condition of the above expression (9) is satisfied) in the above expression (10):

$$q_2 = c_1a_2 + b_1b_2m.$$

No tertiary distortion is caused if the tertiary coefficient $q_3$ expressed as follows is "0" (i.e., if the condition of the above expression (8) is satisfied) in the above expression (10):

$$q_3 = d_1a_2 + c_1b_2m.$$

(3) Third Embodiment

The structure of a third embodiment is basically similar to that shown in FIG. 1. In the third embodiment, however, first and second delay quantities $DL_1$ and $DL_2$ are different from each other. In other words, transmission path lengths for the first and second modulation signals are unequal to each other.

In this case, the delay quantity in the delay portion 110 is adjusted, the level $P_2$ of the second modulation signal is adjusted in the level adjusting portion 111 and the bias voltage ($V_b$) outputted from the bias voltage generating portion 107 is selected so that the frequency f, the aforementioned "m", the difference $DL_x = (DL_2 - DL_1)$ between the first and second delay quantities $DL_1$ and $DL_2$, and the respective coefficients of the input/output transfer functions $F_1(x)$ and $F_2(x)$ satisfy the following relations:

In case of suppressing the tertiary distortion, the delay portion 110, the level adjusting portion 111 and the bias voltage generating portion 107 are set so as to satisfy the following expression (11):

$$a_1d_2m^3 \cdot \exp\{-3j \cdot 2\pi(DL_x \cdot f)\} \quad (11)$$
$$+ b_1c_2m^2 \cdot \exp\{-2j \cdot 2\pi(DL_x \cdot f)\}$$
$$+ c_1b_2m \cdot \exp\{-j \cdot 2\pi(DL_x \cdot f)\}$$
$$+ d_1a_2 = 0$$

In case of suppressing secondary distortion, on the other hand, the delay portion 110, the level adjusting portion 111 and the bias voltage generating portion 107 are set so as to satisfy the following expression (12):

$$a_1c_2m^2 \cdot \exp\{-2j \cdot 2\pi(DL_x \cdot f)\} \quad (12)$$
$$+ b_1b_2m \cdot \exp\{-j \cdot 2\pi(DL_x \cdot f)\}$$
$$+ c_1a_2 = 0$$

When the first and second delay quantiites $DL_1$ and $DL_2$ are different from each other, assuming the difference between the first and second delay quantities $DL_1$ and $DL_2$ with respect to the signal frequency f as $DL_x = (DL_2 - DL_1)$, as described above, the input/output transfer function $F_{total}(x)$ of the system inputting the first modulation signal and outputting the light signal outgoing from the external light modulation portion 106 is expressed as follows:

$$F(x)_{total}$$
$$= F_1(x) \cdot F_2(m \cdot x \cdot \exp\{-j \cdot 2\pi(DL_x \cdot f)\}) \quad (13)$$

When $F_1(x)$ and $F_2(x)$ are expressed in the expressions (1) and (2) respectively, the above expression (13) is expanded as follows:

$$
\begin{aligned}
F_{total}(X) &= a_1 a_2 \\
&+ [b_1 a_2 + a_1 b_2 m \cdot \exp\{-j \cdot 2\pi(DL_x \cdot f)\}] x \\
&+ [c_1 a_2 + b_1 b_2 m \cdot \exp\{-j \cdot 2\pi(DL_x \cdot f)\} \\
&\quad + a_1 c_2 m^2 \cdot \exp\{-2j \cdot 2\pi(DL_x \cdot f)\}] x^2 \\
&+ [d_1 a_2 + c_1 b_2 m \cdot \exp\{-j \cdot 2\pi(DL_x \cdot f)\} \\
&\quad + b_1 c_2 m^2 \cdot \exp\{-2j \cdot 2\pi(DL_x \cdot f)\} \\
&\quad + a_1 d_2 m^3 \cdot \exp\{-3j \cdot 2\pi(DL_x \cdot f)\}] x^3 \\
&+ [d_1 b_2 m \cdot \exp\{-j \cdot 2\pi(DL_x \cdot f)\} \\
&\quad + c_1 c_2 m^2 \cdot \exp\{-2j \cdot 2\pi(DL_x \cdot f)\} \\
&\quad + b_1 d_2 m^3 \cdot \exp\{-3j \cdot 2\pi(DL_x \cdot f)\}] x^4 \\
&+ [d_1 c_2 m^2 \cdot \exp\{-2j \cdot 2\pi(DL_x \cdot f)\} \\
&\quad + c_1 d_2 m^3 \cdot \exp\{-3j \cdot 2\pi(DL_x \cdot f)\}] x^5 \\
&+ [d_1 d_2 m^3 \cdot \exp\{-3j \cdot 2\pi(DL_x \cdot f)\}] x^6
\end{aligned}
\tag{14}
$$

No secondary distortion is caused if the secondary coefficient $q_2$ expressed as follows is "0" (i.e., if the condition of the above expression (12) is satisfied) in the above expression (14):

$$
\begin{aligned}
q_2 &= c_1 a_2 \\
&+ b_1 b_2 m \cdot \exp\{-j \cdot 2\pi(DL_x \cdot f)\} \\
&+ a_1 c_2 m^2 \cdot \exp\{-2j \cdot 2\pi(DL_x \cdot f)\}
\end{aligned}
$$

No tertiary distortion is caused if the tertiary coefficient $q_3$ expressed as follows is "0" (i.e., if the condition of the above expression (11) is satisfied) in the above expression (14):

$$
\begin{aligned}
q_3 &= d_1 a_2 + c_1 b_2 m \cdot \exp\{-j \cdot 2\pi(DL_x \cdot f)\} \\
&+ b_1 c_2 m^2 \cdot \exp\{-2j \cdot 2\pi(DL_x \cdot f)\} \\
&+ a_1 d_2 m^3 \cdot \exp\{-3j \cdot 2\pi(DL_x \cdot f)\}
\end{aligned}
$$

(4) Fourth Embodiment

The structure of a fourth embodiment is basically similar to that shown in FIG. 1. In the fourth embodiment, however, similarly to the aforementioned second embodiment, the external light modulation portion 106 which linearity is excellent is employed or the degree of light modulation therein is set to be small. Therefore, in the fourth embodiment, the input/output transfer function $F_2(x)$ of the external light modulation portion 106 is expressed in the above simple expression (7) in place of the above expression (2). In the fourth embodiment, further, the first and second delay quantities $DL_1$ and $DL_2$ are different from each other, similarly to the aforementioned third embodiment. Namely, the transmission path lengths for the first and second modulation signals are unequal to each other.

In this case, the delay quantity in the delay portion 110 is adjusted, the level $P_2$ of the second modulation signal is adjusted in the level adjusting portion 111, and the bias voltage ($V_b$) outputted from the bias voltage generating portion 107 is selected so that the frequency f, the aforementioned "m", the difference $DL_x = (DL_2 - DL_1)$ between the first and second delay quantities $DL_1$ and $DL_2$, and the respective coefficients of the input/output transfer functions $F_1(x)$ and $F_2(x)$ satisfy the following relations:

In case of suppressing tertiary distortion, the delay portion 110, the level adjusting portion 111 and the bias voltage generating portion 107 are set so as to satisfy the relation of the following expression (15):

$$c_1 b_2 m \cdot \exp\{-j \cdot 2\pi(DL_x \cdot f)\} + d_1 a_2 = 0 \tag{15}$$

In case of suppressing secondary distortion, on the other hand, the delay portion 110, the level adjusting portion 111 and the bias voltage generating portion 107 are set so as to satisfy the relation of the following expression (16):

$$b_1 b_2 m \cdot \exp\{-j 2\pi(DL_x \cdot f)\} + c_1 a_2 = 0 \tag{16}$$

When the input/output transfer function $F_2(x)$ of the external modulation portion 106 is expressed in the expression (7) in place of the expression (2) as described above and the difference between the first and second delay quantities $DL_1$ and $DL_2$ are different from each other, assuming the difference between the first and second delay quantities $DL_1$ and $DL_2$ with respect to the signal frequency f as $DL_x = (DL_1 - DL_2)$ the input/output transfer function $F_{total}(x)$ of the system inputting the first modulation signal and outputting the light signal outgoing from the external light modulation portion 106 is expressed as follows:

$$
\begin{aligned}
F_{total}(x) &= a_1 a_2 \\
&+ [b_1 a_2 + a_1 b_2 m \cdot \exp\{-j \cdot 2\pi(DL_x \cdot f)\}] x \\
&+ [c_1 a_2 + b_1 b_2 m \cdot \exp\{-j \cdot 2\pi(DL_x \cdot f)\}] x^2 \\
&+ [d_1 a_2 + c_1 b_2 m \cdot \exp\{-j \cdot 2\pi(DL_x \cdot f)\}] x^3 \\
&+ [d_1 b_2 m \cdot \exp\{-j \cdot 2\pi(DL_x \cdot f)\}] x^4
\end{aligned}
\tag{17}
$$

No secondary distortion is caused if the secondary coefficient $q_2$ expressed as follows is "0" (i.e., if the condition of the above expression (16) is satisfied) in the above expression (17):

$$q_2 = c_1 a_2 + b_1 b_2 m \cdot \exp\{-j \cdot 2\pi(DL_x \cdot f)\}.$$

No tertiary distortion is caused if the tertiary coefficient $q_3$ expressed as follows is "0" (i.e., if the condition of the above expression (15) is satisfied) in the above expression (17):

$$q_3 = d_1 a_2 + c_1 b_2 m \cdot \exp\{-j \cdot 2\pi(DL_x \cdot f)\}.$$

(5) Fifth Embodiment

The structure of a fifth embodiment is basically similar to that of FIG. 1. The fifth embodiment is now described.

Figure 4:
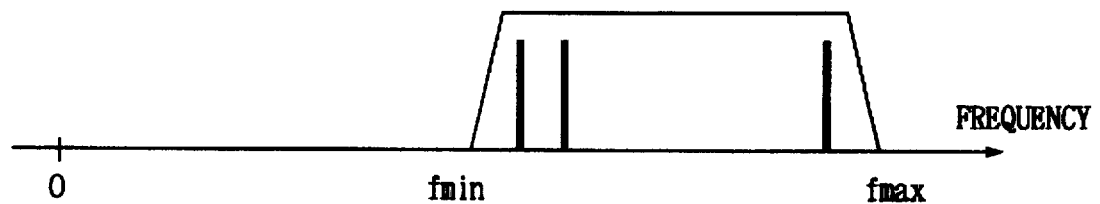
FIG. 4 illustrates frequency arrangement of a modulation signal in the fifth embodiment of the present invention.

FIG. 4 illustrates frequency arrangement of an electric signal outputted from the signal source 101 in the fifth embodiment. As shown in FIG. 4, the signal source 101 outputs a frequency division multiplexing signal formed by multiplexing a plurality of signals by carrier waves of different frequencies in a frequency space. The signal source 101 is set so that minimum and maximum carrier frequencies $f_{min}$ and $f_{max}$ in the used frequency band satisfy the following expression (18):

$$f_{max} < 2 \cdot f_{min} \tag{18}$$

When the signal source 101 is set in the aforementioned manner, no secondary distortion caused in the used frequency band ($f_{min}$–$f_{max}$). On the other hand, occurrence of tertiary distortion is suppressed by setting the delay portion 110, the level adjusting portion 111 and the bias voltage generating portion 107 to satisfy the relation of the expression (3) or (8) as to the frequency f in the frequency division multiplexing signal. Thus, transmission can be made with neither secondary nor tertiary distortion.

In the fifth embodiment, the transmission band is limited in an octave as described above, and hence the number of carrier waves which can be frequency-multiplexed is limited. In order to transmit information in a larger capacity while satisfying the condition of the expression (18), the transmission band is preferably set in a higher region. However, such high frequency band for the transmission signal leads to increase of the cost for electric circuits such as a receiving circuit, in particular. Embodiments which can make the frequency bands high for transmission signals while suppressing such increase of the apparatus costs are now described as sixth and seventh embodiments of the present invention.

(6) Sixth Embodiment

Figure 5:
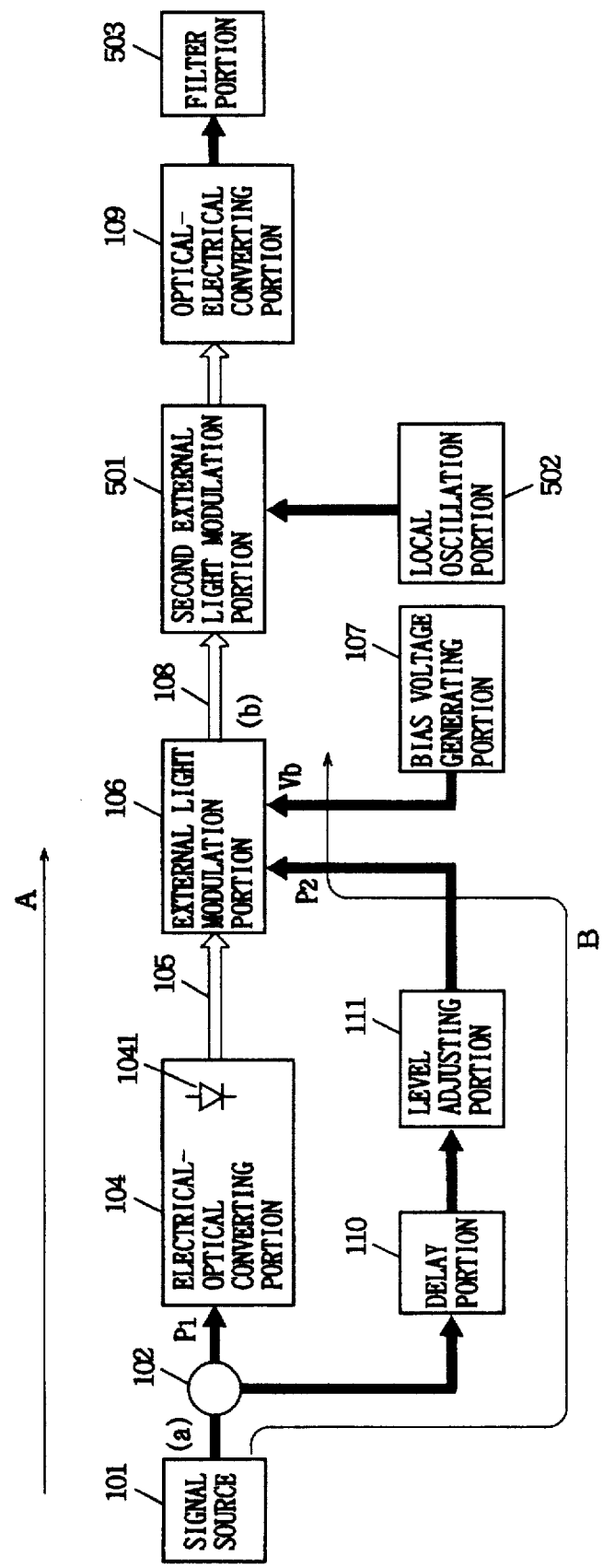
FIG. 5 is a block diagram showing the structure of an optical transmission system according to a sixth embodiment of the present invention.
Figure 8:
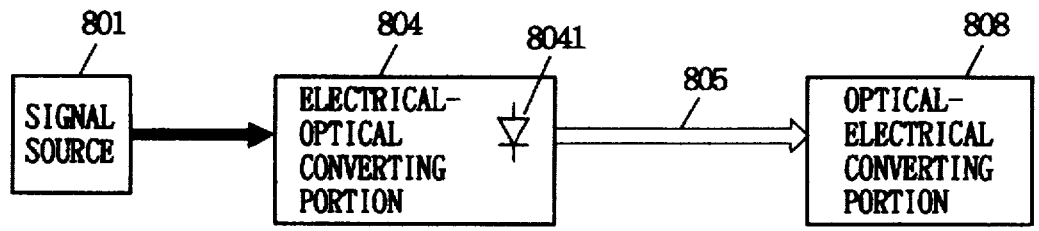
FIG. 8 is a block diagram showing an exemplary structure of a conventional optical transmission system.

FIG. 5 is a block diagram showing the structure of an optical transmission system according to the sixth embodiment of the present invention. Referring to FIG. 5, the optical transmission system according to this embodiment comprises a signal source 101, a branch portion 102, an electrical-optical converting portion 104, a first optical transmission path 105, an external light modulation portion 106, a bias voltage generating portion 107, a second optical transmission path 108, an optical-electical converting portion 109, a delay portion 110, a level adjusting portion 111, a second external light modulation portion 501, a local oscillation portion 502, and a filter portion 503. The electrical-optical converting portion 104 includes a light source 1041.

The operation of the sixth embodiment having the aforementioned structure is now described.

Operations of the respective portions for outputting a light signal from the external light modulation portion 106 and setting/adjustment of respective parameters are similar to those in the first embodiment (FIG. 1) of the present invention, and hence redundant description is omitted. The light signal outputted from the external light modulation portion 106 is inputted in the second external light modulation portion 501 through the second optical transmission path 108. A bias voltage is supplied with the second external light modulation portion 501, similarly to the external light modulation portion 106, so that its input/output transfer function is most improved in linearity. The second external light modulation portion 501 performs light intensity modulation of the inputted light signal with a signal of a frequency $f_{local}$ ($f_{local}$: integer smaller than f) which is supplied from the local oscillation portion 502. The optical-electical converting portion 109 re-converts the light signal outputted from the second external light modulation portion 501 to an electric signal. The filter portion 503 passes only a prescribed frequency component in the electric signal and outputs the same. In this embodiment, the frequency component transmitted by the filter portion 503 is "f - $f_{local}$".

The aforementioned sixth embodiment is now described in further detail. FIG. 6(a) shows frequency arrangement of an electric signal outputted from the signal source 101 of FIG. 5. As shown in FIG. 6(a), minimum and maximum frequencies $f_{min}$ and $f_{max}$ of the band are set to satisfy the above expression (18). Thus, no secondary distortion is caused in this band ($f_{min}$~$f_{max}$). Further, the delay portion 110, the level adjusting portion 111 and the bias voltage generating portion 107 are set to satisfy the relation of the above expression (3) or (8) with respect to the frequency f in the frequency division multiplexing signal, thereby suppressing an occurrence of the tertiary distortion. Thus, transmission can be made with neither secondary nor tertiary distortion. Further, the frequency $f_{local}$ of the output signal from the local oscillation portion 502 is set to satisfy the following expression (19):

$$f_{min} > f_{local} > f_{max-fmin} \quad (19)$$

Therefore, the modulation signal of the band $f_{min}$~$f_{max}$ is down-converted with the signal of the frequency $f_{local}$ outputted from the local oscillation portion 502, and the light signal outputted from the second external light modulation portion 501 has a signal component of a band $f_{min}'$ (=$f_{min}$-$f_{local}$)~$f_{max}'$ (=$f_{max}$- $f_{local}$), as shown in FIG. 6(b). The optical-electical converting portion 109 reconverts the light signal outputted from the second external light modulation portion 501 to an electric signal. The filter portion 503 passes only a frequency component ("$f_{min}'$~$f_{max}'$") which is lower than $f_{local}$ in this electric signal and outputs the same.

According to the sixth embodiment, as hereinabove described, a larger number of carrier waves can be transmitted while avoiding cost increase resulting from the high frequency band of the receiving circuit and setting the transmission frequency band in a higher region due to the structure of down-converting the transmission signal immediately before optical-electrical conversion.

(7) Seventh Embodiment

FIG. 7 is a block diagram showing the structure of an optical transmission system according to a seventh embodiment of the present invention. Referring to FIG. 7, the optical transmission system according to this embodiment comprises a signal source 101, a branch portion 102, an electrical-optical converting portion 104, a first optical transmission path 105, an external light modulation portion 106, a bias voltage generating portion 107, a second optical transmission path 108, a optical-electical converting portion 109, a delay portion 1 10, a level adjusting portion 111, a local oscillation portion 502, a filter portion 503, and a mixer portion 701. The electrical-optical converting portion 104 includes a light source 1041.

The operation of the seventh embodiment having the aforementioned structure is now described.

Operations of the respective portions for outputting a light signal from the external light modulation portion 106 and setting/adjustment of respective parameters are similar to those in the first embodiment (FIG. 1) of the present invention, and hence redundant description is omitted. The light signal outputted from the external light modulation portion 106 is inputted in the optical-electical converting portion 109 through the second optical transmission path 108, and reconverted to an electric signal. The mixer portion 701 frequency-converts the electric signal to $f_{local}$- f with a signal of a frequency fioal outputted from the local oscillation portion 502. The filter portion 503 passes only a prescribed frequency component ("f - $f_{local}$") and outputs the same.

The aforementioned seventh embodiment is now described in further detail. Similarly to the sixth embodiment, the signal source 101 outputs an electric signal of the frequency arrangement shown in FIG. 6(a), and minimum and maximum frequencies $f_{min}$ and $f_{max}$ in this band are set to satisfy the above expression (18). Thus, no secondary distortion is caused in the range ($f_{min}$~$f_{max}$). Further, an occurrence of the tertiary distortion is suppressed by setting the delay portion 110, the level adjusting portion 111 and the bias voltage generating portion 107 to satisfy the relation of the above expression (3) or (8) as to the frequency f in the frequency division multiplexing signal. Thus, transmission can be made with neither secondary nor tertiary distortion. Further, the output signal frequency $f_{local}$ of the local oscillator 502 is set to satisfy the above expression (19).

Therefore, the modulation signal of the band $f_{min}$~$f_{max}$ is down-converted with the signal of the frequency $f_{local}$ outputted from the local oscillation portion 502, and the electric signal outputted from the mixer portion 701 has a signal component of the band $f_{min}'$(=$f_{min}$—$f_{local}$)~$f_{max}'$(= $f_{max}$—$f_{local}$), as shown in FIG. 6(b). The filter portion 112 passes only a frequency component which is lower than $f_{local}$ ("$f_{min}'$~$f_{max}'$") in the output signal from the mixer portion 701 and outputs the same.

According to the seventh embodiment, as hereinabove described, a larger number of carrier waves can be transmitted while avoiding cost increase resulting from the high frequency of the receiving circuit and setting the transmission frequency band in a higher region due to the structure of down-converting the transmission signal immediately after optical-electrical conversion.

In each of the aforementioned embodiments, the lengths of the signal propagation paths A and B may be set at proper values so that the first and second delay quantities $DL_1$ and $DL_2$ in the signal propagation paths A and B have a prescribed relation (to be equal to each other, for example) in the stage of initial design. In this case, the first and second delay quantities $DL_1$ and $DL_2$ are supplied by delay characteristics of signal lines themselves, and no delay portion 110 may be separately provided.

In each of the aforementioned embodiments, it is possible to bring the levels $P_1$ and $P_2$ of the first and second modulation signals into a relation expressed as follows:

$$P_1:P_2=1:m$$

by selecting the electric signal branch ratio in the branch portion 102 at a proper value. In this case, no level adjusting portion 111 may be separately provided.

In each of the aforementioned embodiments, furthermore the external light modulation system may alternatively be employed as the light modulation system in the electrical-optical converting portion 104, and an effect similar to that of the above can be attained also in this case.

Although the present invention has been described and illustrated in detail, it is clearly understood that the same is by way of illustration and example only and is not to be taken by way of limitation, the spirit and scope of the present invention being limited only by the terms of the appended claims.

When the electric signal outputted from the signal source is a single frequency f, the above distortion compensating conditional expressions (3), (8), (11) and (15) can be implemented. On the other hand, when the electric signal is the frequency division multplexing signal, the above distortion compensating conditional expressions (11) and (15) are difficult to be implemented. Thus, in each of the aforementioned fifth to seventh embodiments, in case of employing the signal source 101 which outputs the electric signal, which is not fomed by frequency division multiplexing, at the single frequency f, the occurance of the tertiary distortion can be suppressed by setting the delay portion 110, the level adjusting portion 111 and the bias voltage generating portion 107 to satisfy the relation of the above expression (3), (8), (11) or (15) with respect to the signal frequency f.

What is claimed is:

1. An optical transmission system for converting an electric signal to a light signal and transmitting the same, comprising:

a signal source for outputting the electric signal;

a branch portion for branching said electric signal into two electric signals;

an electrical-optical converting portion for converting a first modulation signal, which is one of the two electric signals branched in said branch portion, to an intensity-modulated light signal and outputting the same;

a first optical transmission path for transmitting the light signal outputted from said electrical-optical converting portion;

a delay portion for providing a second modulation signal, which is the other one of the two electric signals being branched in said branch portion, with a prescribed quantity of time delay;

an external light modulation portion operating in a state of being supplied with a prescribed bias voltage for intensity-modulating the light signal transmitted through said first optical transmission path in accordance with the value of the second modulation signal outputted from said delay portion;

a second optical transmission path for transmitting the light signal outputted from said external light modulation portion; and an optical-electical converting portion for re-converting the light signal transmitted through said second optical transmission path to an electric signal.

2. The optical transmission system according to claim 1, further comprising:

a local oscillation portion for outputting a signal at a prescribed frequency;

a second external light modulation portion for intensity-modulating the light signal transmitted through said second optical transmission path in accordance with the value of the signal outputted from said local oscillation portion and outputting the same to said optical-electical converting portion; and a filter portion for passing only a prescribed frequency component in the electric signal outputted from said optical-electical converting portion.

3. The optical transmission system according to claim 1, further comprising:

a local oscillation portion for outputting a signal at a prescribed frequency;

a mixer portion for mixing the electric signal outputted from said optical-electical converting portion with the signal outputted from said local oscillation portion; and a filter portion for passing only a prescribed frequency component in the electric signal outputted from said mixer portion.

4. The optical transmission system according to claim 1, wherein when a delay quantity $DL_1$ of a signal propagation path starting with said signal source and leading to said second optical transmission path through said branch portion, said electrical-optical converting portion, said first optical transmission path and said external light modulation portion, and a delay quantity $DL_2$ of a signal propagation path starting with said signal source and leading to said second optical transmission path through said branch portion, said delay portion and said external light modulation portion are set to be equal to each other, an input/output transfer function $F_1(x)$ describing a relation between the input electric signal (said first modulation signal) and the output light signal in said electrical-optical converting portion is expressed as folows:

$$F_1(x)=a_1+b_1x+c_1x^2+d_1x^3;$$

an input/output transfer function $F_2(x)$ describing a relation between the input electric signal (said second modulation signal) and the output light signal in said external light modulation portion in the state of being supplied with said prescribed bias voltage is expressed as follows:

$$F_2(x)=a_2+b_2x+c_2x^2+d_2x^3, \text{ and}$$

a ratio of a level $P_1$ of said first modulation signal to a level $P_2$ of said second modulation signal is expressed as follows:

$P_1:P_2 = 1:m$, the levels $P_1$ and $P_2$ of said first and second modulation signals, and the bias voltage supplied with said external light modulation portion are set so that said "m" and, coefficients of said input/output transfer functions $F_1(x)$ and $F_2(x)$ satisfy a relation expressed as folows:

$a_1d_2m^3+b_1c_2m^2+c_1b_2m+d_1a_2=0$.

5. The optical transmission system according to claim 2, wherein
    when the delay quantity $DL_1$ of the signal propagation path starting with said signal source and leading to said second optical transmission path through said branch portion, said electrical-optical converting portion, said first optical transmission path and said external light modulation portion, and the delay quantity $DL_2$ of the signal propagation path starting with said signal source and leading to said second optical transmission path through said branch portion, said delay portion and said external light modulation portion are set to be equal to each other,
    the input/output transfer function $F_1(x)$ describing the relation between the input electric signal (said first modulation signal) and the output light signal in said electrical-optical converting portion is expressed as folows:

$F_1(x)=a_1+b_1x+c_1x^2+d_1x^3$, the input/output transfer function $F_2(x)$ describing the relation between the input electric signal (said second modulation signal) and the output light signal in said external light modulation portion in the state of being supplied with said prescribed bias voltage is expressed as follows:

$F_2(x)=a_2+b_2x+c_2x^2+d_2x^3$, and the ratio of the level $P_1$ of said first modulation signal to the level $P_2$ of said second modulation signal is expressed as follows:

$P_1:P_2=1:m$, the levels $P_1$ and $P_2$ of said first and second modulation signals, and the bias voltage supplied with said external light modulation portion are set so that said "m" and, the coefficients of said input/output transfer functions $F_1(x)$ and $F_2(x)$ satisfy the relation expressed as folows:

$a_1d_2m^3+b_1c_2m^2+c_1b_2m+d_1a_2=0$.

6. The optical transmission system according to claim 3, wherein
    when the delay quantity $DL_1$ of the signal propagation path starting with said signal source and leading to said second optical transmission path through said branch portion, said electrical-optical converting portion, said first optical transmission path and said external light modulation portion, and the delay quantity $DL_2$ of the signal propagation path starting with said signal source and leading to said second optical transmission path through said branch portion, said delay portion and said external light modulation portion are set to be equal to each other,
    the input/output transfer function $F_1(x)$ describing the relation between the input electric signal (said first modulation signal) and the output light signal in said electrical-optical converting portion is expressed as folows:

$F_1(x)=a_1+b_1x+c_1x^2+d_1x^3$, the input/output transfer function $F_2(x)$ describing the relation between the input electric signal (said second modulation signal) and the output light signal in said external light modulation portion in the state of being supplied with said prescribed bias voltage is expressed as follows:

$F_2(x)=a_2+b_2x+c_2x^2+d_2x^3$, and the ratio of the level $P_1$ of said first modulation signal to the level $P_2$ of said second modulation signal is expressed as follows:

$P_1:P_2=1:m$, the levels $P_1$ and $P_2$ of said first and second modulation signals, and the bias voltage supplied with said external light modulation portion are set so that said "m" and, the coefficients of said input/output transfer functions $F_1(x)$ and $F_2(x)$ satisfy the relation expressed as folows:

$a_1d_2m^3+b_1c_2m^2+c_1b_2m+d_1a_2=0$.

7. The optical transmission system according to claim 1, wherein
    when the delay quantity $DL_1$ of the signal propagation path starting with said signal source and leading to said second optical transmission path through said branch portion, said electrical-optical converting portion, said first optical transmission path and said external light modulation portion, and the delay quantity $DL_2$ of the signal propagation path starting with said signal source and leading to said second optical transmission path through said branch portion, said delay portion and said external light modulation portion are set to be equal to each other,
    the input/output transfer function $F_1(x)$ describing the relation between the input electric signal (said first modulation signal) and the output light signal in said electrical-optical converting portion is expressed as folows:

$F_1(x)=a_1+b_1x+c_1x^2+d_1x^3$, the input/output transfer function $F_2(x)$ describing the relation between the input electric signal (said second modulation signal) and the output light signal in said external light modulation portion in the state of being supplied with said prescribed bias voltage is expressed as follows:

$F_2(x)=a_2+b_2x$, and the ratio of the level $P_1$ of said first modulation signal to the level $P_2$ of said second modulation signal is expressed as follows:

$P_1:P_2=1:m$, the levels $P_1$ and $P_2$ of said first and second modulation signals, and the bias voltage supplied with said external light modulation portion are set so that said "m" and, the coefficients of said input/output transfer functions $F_1(x)$ and $F_2(x)$ satisfy the relation expressed as folows:

$$c_1 b_2 m + d_1 a_2 0 \text{ (or } m = -d_1 a_2 / c_1 b_2\text{)}.$$

8. The optical transmission system according to claim 2, wherein when the delay quantity $DL_1$ of the signal propagation path starting with said signal source and leading to said second optical transmission path through said branch portion, said electrical-optical converting portion, said first optical transmission path and said external light modulation portion, and the delay quantity $DL_2$ of the signal propagation path starting with said signal source and leading to said second optical transmission path through said branch portion, said delay portion and said external light modulation portion are set to be equal to each other, the input/output transfer function $F_1(x)$ describing the relation between the input electric signal (said first modulation signal) and the output light signal in said electrical-optical converting portion is expressed as folows:

$$F_1(x) = a_1 + b_1 x + c_1 x^2 + d_1 x^3,$$

the input/output transfer function $F_2(x)$ describing the relation between the input electric signal (said second modulation signal) and the output light signal in said external light modulation portion in the state of being supplied with said prescribed bias voltage is expressed as follows:

$$F_2(x) = a_2 + b_2 x, \text{ and}$$

the ratio of the level $P_1$ of said first modulation signal to the level $P_2$ of said second modulation signal is expressed as follows:

$$P_1 : P_2 = 1 : m,$$

the levels $P_1$ and $P_2$ of said first and second modulation signals, and the bias voltage supplied with said external light modulation portion are set so that said "m" and, the coefficients of said input/output transfer functions $F_1(x)$ and $F_2(x)$ satisfy the relation expressed as folows:

$$c_1 b_2 m + d_1 a_2 0 \text{ (or } m = -d_1 a_2 / c_1 b_2\text{)}.$$

9. The optical transmission system according to claim 3, wherein when the delay quantity $DL_1$ of the signal propagation path starting with said signal source and leading to said second optical transmission path through said branch portion, said electrical-optical converting portion, said first optical transmission path and said external light modulation portion, and the delay quantity $DL_2$ of the signal propagation path starting with said signal source and leading to said second optical transmission path through said branch portion, said delay portion and said external light modulation portion are set to be equal to each other, the input/output transfer function $F_1(x)$ describing the relation between the input electric signal (said first modulation signal) and the output light signal in said electrical-optical converting portion is expressed as folows:

$$F_1(x) = a_1 + b_1 x + c_1 x^2 + d_1 x^3,$$

the input/output transfer function $F_2(x)$ describing the relation between the input electric signal (said second modulation signal) and the output light signal in said external light modulation portion in the state of being supplied with said prescribed bias voltage is expressed as follows:

$$F_2(x) = a_2 + b_2 x, \text{ and}$$

the ratio of the level $P_1$ of said first modulation signal to the level $P_2$ of said second modulation signal is expressed as follows:

$$P_1 : P_2 = 1 : m,$$

the levels $P_1$ and $P_2$ of said first and second modulation signals, and the bias voltage supplied with said external light modulation portion are set so that said "m" and, the coefficients of said input/output transfer functions $F_1(x)$ and $F_2(x)$ satisfy the relation expressed as folows:

$$c_1 b_2 m + d_1 a_2 = 0 \text{ (or } m = -d_1 a_2 / c_1 b_2\text{)}.$$

10. The optical transmission system according to claim 1, wherein when the delay quantity $DL_1$ of the signal propagation path starting with said signal source and leading to said second optical transmission path through said branch portion, said electrical-optical converting portion, said first optical transmission path and said external light modulation portion, and the delay quantity $DL_2$ of the signal propagation path starting with said signal source and leading to said second optical transmission path through said branch portion, said delay portion and said external light modulation portion are different from each other, a frequency of the electric signal outputted from said signal source is represented by f, the input/output transfer function $F_1(x)$ describing the relation between the input electric signal (said first modulation signal) and the output light signal in said electrical-optical converting portion is expressed as folows:

$$F_1(x) = a_1 + b_1 x + c_1 x^2 + d_1 x^3,$$

the input/output transfer function $F_2(x)$ describing the relation between the input electric signal (said second modulation signal) and the output light signal in said external light modulation portion in the state of being supplied with said prescribed bias voltage is expressed as follows:

$$F_2(x) = a_2 + b_2 x + c_2 x^2 + d_2 x^3, \text{ and}$$

the ratio of the level $P_1$ of said first modulation signal to the level $P_2$ of said second modulation signal is expressed as follows:

$$P_1 : P_2 = 1 : m,$$

the levels $P_1$ and $P_2$ of said first and second modulation signals, the time delay quantity in said delay portion and the bias voltage supplied with said external light modulation portion are set so that a difference $DL_x$ between said delay quantities $DL_1$ and $DL_2$ that is $DL_x = (DL_2 - DL_1)$, said "m" and, the coefficients of said input/output transfer functions $F_1(x)$ and $F_2(x)$ satisfy the relation expressed as folows:

$$a_1 d_2 m^3 \cdot \exp\{-3j \cdot 2\pi(DL_x \cdot f)\}$$
$$+b_1 c_2 m^2 \cdot \exp\{-2j \cdot 2\pi(DL_x \cdot f)\}$$
$$+c_1 b_2 m \cdot \exp\{-j \cdot 2\pi(DL_x \cdot f)\}$$
$$+d_1 a_2 = 0.$$

11. The optical transmission system according to claim 2, wherein when the delay quantity $DL_1$ of the signal propagation path starting with said signal source and leading to said second optical transmission path through said branch portion, said electrical-optical converting portion, said first optical transmission path and said external light modulation portion, and the delay quantity $DL_2$ of the signal propagation path starting with said signal source and leading to said second optical transmission path through said branch portion, said delay portion and said external light modulation portion are different from each other, the frequency of the electric signal outputted from said signal source is represented by f, the input/output transfer function $F_1(x)$ describing the relation between the input electric signal (said first modulation signal) and the output light signal in said electrical-optical converting portion is expressed as folows:

$$F_1(x) = a_1 + b_1 x + c_1 x^2 + d_1 x^3,$$

the input/output transfer function $F_2(x)$ describing the relation between the input electric signal (said second modulation signal) and the output light signal in said external light modulation portion in the state of being supplied with said prescribed bias voltage is expressed as follows:

$$F_2(x) = a_2 + b_2 x + c_2 x^2 + d_2 x^3, \text{ and}$$

the ratio of the level $P_1$ of said first modulation signal to the level $P_2$ of said second modulation signal is expressed as follows:

$$P_1 : P_2 = 1 : m,$$

the levels $P_1$ and $P_2$ of said first and second modulation signals, the time delay quantity in said delay portion and the bias voltage supplied with said external light modulation portion are set so that the difference $DL_x$ between said delay quantities $DL_1$ and $DL_2$, that is $DL_x = (DL_2 - DL_1)$, said "m" and, the coefficients of said input/output transfer functions $F_1(x)$ and $F_2(x)$ satisfy the relation expressed as folows:

$$a_1 d_2 m^3 \cdot \exp\{-3j \cdot 2\pi(DL_x \cdot f)\}$$
$$+b_1 c_2 m^2 \cdot \exp\{-2j \cdot 2\pi(DL_x \cdot f)\}$$
$$+c_1 b_2 m \cdot \exp\{-j \cdot 2\pi(DL_x \cdot f)\}$$
$$+d_1 a_2 = 0.$$

12. The optical transmission system according to claim 3, wherein when the delay quantity $DL_1$ of the signal propagation path starting with said signal source and leading to said second optical transmission path through said branch portion, said electrical-optical converting portion, said first optical transmission path and said external light modulation portion, and the delay quantity $DL_2$ of the signal propagation path starting with said signal source and leading to said second optical transmission path through said branch portion, said delay portion and said external light modulation portion are different from each other, the frequency of the electric signal outputted from said signal source is represented by f, the input/output transfer function $F_1(x)$ describing the relation between the input electric signal (said first modulation signal) and the output light signal in said electrical-optical converting portion is expressed as folows:

$$F_1(x) = a_1 + b_1 x + c_1 x^2 + d_1 x^3,$$

the input/output transfer function $F_2(x)$ describing the relation between the input electric signal (said second modulation signal) and the output light signal in said external light modulation portion in the state of being supplied with said prescribed bias voltage is expressed as follows:

$$F_2(x) = a_2 + b_2 x + c_2 x^2 + d_2 x^3, \text{ and}$$

the ratio of the level $P_1$ of said first modulation signal to the level $P_2$ of said second modulation signal is expressed as follows:

$$P_1 : P_2 = 1 : m,$$

the levels $P_1$ and $P_2$ of said first and second modulation signals, the time delay quantity in said delay portion and the bias voltage supplied with said external light modulation portion are set so that the difference $DL_x$ between said delay quantities $DL_1$ and $DL_2$, that is $DL_x = (DL_2 - DL_1)$, said "m" and, the coefficients of said input/output transfer functions $F_1(x)$ and $F_2(x)$ satisfy the relation expressed as folows:

$$a_1 d_2 m^3 \cdot \exp\{-3j \cdot 2\pi(DL_x \cdot f)\}$$
$$+b_1 c_2 m^2 \cdot \exp\{-2j \cdot 2\pi(DL_x \cdot f)\}$$
$$+c_1 b_2 m \cdot \exp\{-j \cdot 2\pi(DL_x \cdot f)\}$$
$$+d_1 a_2 = 0.$$

13. The optical transmission system according to claim 1, wherein when the delay quantity $DL_1$ of the signal propagation path starting with said signal source and leading to said second optical transmission path through said branch portion, said electrical-optical converting portion, said first optical transmission path and said external light modulation portion, and the delay quantity $DL_2$ of the signal propagation path starting with said signal source and leading to said second optical transmission path through said branch portion, said delay portion and said external light modulation portion are different from each other, the frequency of the electric signal outputted from said signal source is represented by f, the input/output transfer function $F_1(x)$ describing the relation between the input electric signal (said first modulation signal) and the output light signal in said electrical-optical converting portion is expressed as folows:

$$F_1(x)=a_1+b_1x+c_1x^2+d_1x^3,$$

the input/output transfer function $F_2(x)$ describing the relation between the input electric signal (said second modulation signal) and the output light signal in said external light modulation portion in the state of being supplied with said prescribed bias voltage is expressed as follows:

$$F_2(x)=a_2+b_2x, \text{ and}$$

the ratio of the level $P_1$ of said first modulation signal to the level $P_2$ of said second modulation signal is expressed as follows:

$$P_1:P_2=1:m,$$

the levels $P_1$ and $P_2$ of said first and second modulation signals, the time delay quantity in said delay portion and the bias voltage supplied with said external light modulation portion are set so that the difference $DL_1$ between said delay quantities $DL_1$ and $DL_2$, that is $DL_x=(DL_2-DL_1)$, said "m" and, the coefficients of said input/output transfer functions $F_1(x)$ and $F_2(x)$ satisfy the relation expressed as folows:

$$c_1b_2m\cdot\exp\{-j\cdot 2\pi(DL_x\cdot f)\}+d_1a_2=0.$$

14. The optical transmission system according to claim 2, wherein when the delay quantity $DL_1$ of the signal propagation path starting with said signal source and leading to said second optical transmission path through said branch portion, said electrical-optical converting portion, said first optical transmission path and said external light modulation portion, and the delay quantity $DL_2$ of the signal propagation path starting with said signal source and leading to said second optical transmission path through said branch portion, said delay portion and said external light modulation portion are different from each other, the frequency of the electric signal outputted from said signal source is represented by f, the input/output transfer function $F_1(x)$ describing the relation between the input electric signal (said first modulation signal) and the output light signal in said electrical-optical converting portion is expressed as folows:

$$F_1(x)=a_1+b_1x+c_1x^2+d_1x^3,$$

the input/output transfer function $F_2(x)$ describing the relation between the input electric signal (said second modulation signal) and the output light signal in said external light modulation portion in the state of being supplied with said prescribed bias voltage is expressed as follows:

$$F_2(x)=a_2+b_2x, \text{ and}$$

the ratio of the level $P_1$ of said first modulation signal to the level $P_2$ of said second modulation signal is expressed as follows:

$$P_1:P_2=1:m,$$

the levels $P_1$ and $P_2$ of said first and second modulation signals, the time delay quantity in said delay portion and the bias voltage supplied with said external light modulation portion are set so that the difference $DL_x$ between said delay quantities $DL_1$ and $DL_2$, that is $DL_x=(DL_2-DL_1)$, said "m" and, the coefficients of said input/output transfer functions $F_1(x)$ and $F_2(x)$ satisfy the relation expressed as folows:

$$c_1b_2m\cdot\exp\{-j\cdot 2\pi(DL_x\cdot f)\}+d_1a_2=0.$$

15. The optical transmission system according to claim 3, wherein when the delay quantity $DL_1$ of the signal propagation path starting with said signal source and leading to said second optical transmission path through said branch portion, said electrical-optical converting portion, said first optical transmission path and said external light modulation portion, and the delay quantity $DL_2$ of the signal propagation path starting with said signal source and leading to said second optical transmission path through said branch portion, said delay portion and said external light modulation portion are different from each other, the frequency of the electric signal outputted from said signal source is represented by f, the input/output transfer function $F_1(x)$ describing the relation between the input electric signal (said first modulation signal) and the output light signal in said electrical-optical converting portion is expressed as folows:

$$F_1(x)=a_1+b_1x+c_1x^2+d_1x^3,$$

the input/output transfer function $F_2(x)$ describing the relation between the input electric signal (said second modulation signal) and the output light signal in said external light modulation portion in the state of being supplied with said prescribed bias voltage is expressed as follows:

$$F_2(x)=a_2+b_2x, \text{ and}$$

the ratio of the level $P_1$ of said first modulation signal to the level $P_2$ of said second modulation signal is expressed as follows:

$$P_1:P_2=1:m,$$

the levels $P_1$ and $P_2$ of said first and second modulation signals, the time delay quantity in said delay portion and the bias voltage supplied with said external light modulation portion are set so that the difference $DL_x$ between said delay quantities $DL_1$ and $DL_2$, that is $DL_x=(DL_2-DL_1)$, said "m" and, the coefficients of said input/output transfer functions $F_1(x)$ and $F_2(x)$ satisfy the relation expressed as folows:

$$c_1b_2m\cdot\exp\{-j\cdot 2\pi(DL_x\cdot f)\}+d_1a_2=0.$$

16. The optical transmission system according to claim 1, wherein when the delay quantity $DL_1$ of the signal propagation path starting with said signal source and leading to said second optical transmission path through said branch portion, said electrical-optical converting portion, said first optical transmission path and said external light modulation portion, and the delay quantity $DL_2$ of the signal propagation path starting with said signal source and leading to said second optical transmission path through said branch portion, said delay portion and said external light modulation portion are set to be equal to each other, the input/output transfer function $F_1(x)$ describing the relation between the input electric signal (said first modulation signal) and the output light signal in said electrical-optical converting portion is expressed as folows:

$$F_1(x)=a_1+b_1x+c_1x^2+d_1x^3,$$

the input/output transfer function $F_2(x)$ describing the relation between the input electric signal (said second modulation signal) and the output light signal in said external light modulation portion in the state of being supplied with said prescribed bias voltage is expressed as follows:

$$F_2(x)=a_2+b_2x+c_2x^2+d_2x^3, \text{ and}$$

the ratio of the level $P_1$ of said first modulation signal to the level $P_2$ of said second modulation signal is expressed as follows:

$$P_1:P_2=1:m,$$

the levels $P_1$ and $P_2$ of said first and second modulation signals, and the bias voltage supplied with said external light modulation portion are set so that said "m" and, the coefficients of said input/output transfer functions $F_1(x)$ and $F_2(x)$ satisfy the relation expressed as folows:

$$a_1c_2m^2+b_1b_2m+c_1a_2=0.$$

17. The optical transmission system according to claim 2, wherein when the delay quantity $DL_1$ of the signal propagation path starting with said signal source and leading to said second optical transmission path through said branch portion, said electrical-optical converting portion, said first optical transmission path and said external light modulation portion, and the delay quantity $DL_2$ of the signal propagation path starting with said signal source and leading to said second optical transmission path through said branch portion, said delay portion and said external light modulation portion are set to be equal to each other, the input/output transfer function $F_1(x)$ describing the relation between the input electric signal (said first modulation signal) and the output light signal in said electrical-optical converting portion is expressed as folows:

$$F_1(x)=a_1+b_1x+c_1x^2+d_1x^3,$$

the input/output transfer function $F_2(x)$ describing the relation between the input electric signal (said second modulation signal) and the output light signal in said external light modulation portion in the state of being supplied with said prescribed bias voltage is expressed as follows:

$$F_2(x)=a_2+b_2x+c_2x^2+d_2x^3, \text{ and}$$

the ratio of the level $P_1$ of said first modulation signal to the level $P_2$ of said second modulation signal is expressed as follows:

$$P_1:P_2=1:m,$$

the levels $P_1$ and $P_2$ of said first and second modulation signals, and the bias voltage supplied with said external light modulation portion are set so that said "m" and, the coefficients of said input/output transfer functions $F_1(x)$ and $F_2(x)$ satisfy the relation expressed as folows:

$$a_1c_2m^2+b_1b_2m+c_1a_2=0.$$

18. The optical transmission system according to claim 3, wherein when the delay quantity $DL_1$ of the signal propagation path starting with said signal source and leading to said second optical transmission path through said branch portion, said electrical-optical converting portion, said first optical transmission path and said external light modulation portion, and the delay quantity $DL_2$ of the signal propagation path starting with said signal source and leading to said second optical transmission path through said branch portion, said delay portion and said external light modulation portion are set to be equal to each other, the input/output transfer function $F_1(x)$ describing the relation between the input electric signal (said first modulation signal) and the output light signal in said electrical-optical converting portion is expressed as folows:

$$F_1(x)=a_1+b_1x+c_1x^2+d_1x^3,$$

the input/output transfer function $F_2(x)$ describing the relation between the input electric signal (said second modulation signal) and the output light signal in said external light modulation portion in the state of being supplied with said prescribed bias voltage is expressed as follows:

$$F_2(x)=a_2+b_2x+c_2x^2+d_2x^3, \text{ and}$$

the ratio of the level $P_1$ of said first modulation signal to the level $P_2$ of said second modulation signal is expressed as follows:

$$P_1:P_2=1:m,$$

the levels $P_1$ and $P_2$ of said first and second modulation signals, and the bias voltage supplied with said external light modulation portion are set so that said "m" and, the coefficients of said input/output transfer functions $F_1(x)$ and $F_2(x)$ satisfy the relation expressed as folows:

$$a_1c_2m^2+b_1b_2m+c_1a_2=0.$$

19. The optical transmission system according to claim 1, wherein when the delay quantity $DL_1$ of the signal propagation path starting with said signal source and leading to said second optical transmission path through said branch portion, said electrical-optical converting portion, said first optical transmission path and said external light modulation portion, and the delay quantity $DL_2$ of the signal propagation path starting with said signal source and leading to said second optical transmission path through said branch portion, said delay portion and said external light modulation portion are set to be equal to each other, the input/output transfer function $F_1(x)$ describing the relation between the input electric signal (said first modulation signal) and the output light signal in said electrical-optical converting portion is expressed as folows:

$$F_1(x)=a_1+b_1x+c_1x^2+d_1x^3,$$

the input/output transfer function $F_2(x)$ describing the relation between the input electric signal (said second modulation signal) and the output light signal in said external light modulation portion in the state of being supplied with said prescribed bias voltage is expressed as follows:

$$F_2(x)=a_2+b_2x, \text{ and}$$

the ratio of the level $P_1$ of said first modulation signal to the level $P_2$ of said second modulation signal is expressed as follows:

$$P_1:P_2=1:m,$$

the levels $P_1$ and $P_2$ of said first and second modulation signals, and the bias voltage supplied with said external light modulation portion are set so that said "m" and, the coefficients of said input/output transfer functions $F_1(x)$ and $F_2(x)$ satisfy the relation expressed as folows:

$$b_1b_2m+c_1a_2=0 \text{ (or } m=c_1a_2/b_1b_2).$$

20. The optical transmission system according to claim 2, wherein when the delay quantity $DL_1$ of the signal propagation path starting with said signal source and leading to said second optical transmission path through said branch portion, said electrical-optical converting portion, said first optical transmission path and said external light modulation portion, and the delay quantity $DL_2$ of the signal propagation path starting with said signal source and leading to said second optical transmission path through said branch portion, said delay portion and said external light modulation portion are set to be equal to each other, the input/output transfer function $F_1(x)$ describing the relation between the input electric signal (said first modulation signal) and the output light signal in said electrical-optical converting portion is expressed as folows:

$$F_1(x)=a_1+b_1x+c_1x^2+d_1x^3,$$

the input/output transfer function $F_2(x)$ describing the relation between the input electric signal (said second modulation signal) and the output light signal in said external light modulation portion in the state of being supplied with said prescribed bias voltage is expressed as follows:

$$F_2(x)=a_2+b_2x, \text{ and}$$

the ratio of the level $P_1$ of said first modulation signal to the level $P_2$ of said second modulation signal is expressed as follows:

$$P_1:P_2=1:m,$$

the levels $P_1$ and $P_2$ of said first and second modulation signals, and the bias voltage supplied with said external light modulation portion are set so that said "m" and, the coefficients of said input/output transfer functions $F_1(x)$ and $F_2(x)$ satisfy the relation expressed as folows:

$$b_1b_2m+c_1a_2=0 \text{ (or } m=c_1a_2/b_1b_2).$$

21. The optical transmission system according to claim 3, wherein when the delay quantity $DL_1$ of the signal propagation path starting with said signal source and leading to said second optical transmission path through said branch portion, said electrical-optical converting portion, said first optical transmission path and said external light modulation portion, and the delay quantity $DL_2$ of the signal propagation path starting with said signal source and leading to said second optical transmission path through said branch portion, said delay portion and said external light modulation portion are set to be equal to each other, the input/output transfer function $F_1(x)$ describing the relation between the input electric signal (said first modulation signal) and the output light signal in said electrical-optical converting portion is expressed as folows:

$$F_1(x)=a_1+b_1x+c_1x^2+d_1x^3,$$

the input/output transfer function $F_2(x)$ describing the relation between the input electric signal (said second modulation signal) and the output light signal in said external light modulation portion in the state of being supplied with said prescribed bias voltage is expressed as follows:

$$F_2(x)=a_2+b_2x, \text{ and}$$

the ratio of the level $P_1$ of said first modulation signal to the level $P_2$ of said second modulation signal is expressed as follows:

$$P_1:P_2=1:m,$$

the levels $P_1$ and $P_2$ of said first and second modulation signals, and the bias voltage supplied with said external light modulation portion are set so that said "m" and, the coefficients of said input/output transfer functions $F_1(x)$ and $F_2(x)$ satisfy the relation expressed as folows:

$$b_1b_2m+c_1a_2=0 \text{ (or } m=-c_1a_2/b_1b_2).$$

22. The optical transmission system according to claim 1, wherein when the delay quantity $DL_1$ of the signal propagation path starting with said signal source and leading to said second optical transmission path through said branch portion, said electrical-optical converting portion, said first optical transmission path and said external light modulation portion, and the delay quantity $DL_2$ of the signal propagation path starting with said signal source and leading to said second optical transmission path through said branch portion, said delay portion and said external light modulation portion are different from each other, the frequency of the electric signal outputted from said signal source is represented by f, the input/output transfer function $F_1(x)$ describing the relation between the input electric signal (said first modulation signal) and the output light signal in said electrical-optical converting portion is expressed as folows:

$F_1(x)=a_1+b_1x+c_1x^2+d_1x^3$, the input/output transfer function $F_2(x)$ describing the relation between the input electric signal (said second modulation signal) and the output light signal in said external light modulation portion in the state of being supplied with said prescribed bias voltage is expressed as follows:

$F_2(x)=a_2+b_2x+c_2x^2+d_2x^3$, and the ratio of the level $P_1$ of said first modulation signal to the level $P_2$ of said second modulation signal is expressed as follows:

$P_1:P_2=1:m$, the levels $P_1$ and $P_2$ of said first and second modulation signals, the time delay quantity in said delay portion and the bias voltage supplied with said external light modulation portion are set so that the difference $DL_x$ between said delay quantities $DL_1$ and $DL_2$, that is $DL_x=(DL_2-DL_1)$, said "m" and, the coefficients of said input/output transfer functions $F_1(x)$ and $F_2(x)$ satisfy the relation expressed as folows:

$a_1c_2m^2 \cdot \exp\{-2j \cdot 2\pi(DL_x \cdot f)\}$ $+b_1b_2m \cdot \exp\{-j \cdot 2\pi(DL_x \cdot f)\}+c_1a_2=0$.

23. The optical transmission system according to claim 2, wherein when the delay quantity $DL_1$ of the signal propagation path starting with said signal source and leading to said second optical transmission path through said branch portion, said electrical-optical converting portion, said first optical transmission path and said external light modulation portion, and the delay quantity $DL_2$ of the signal propagation path starting with said signal source and leading to said second optical transmission path through said branch portion, said delay portion and said external light modulation portion are different from each other, the frequency of the electric signal outputted from said signal source is represented by f, the input/output transfer function $F_1(x)$ describing the relation between the input electric signal (said first modulation signal) and the output light signal in said electrical-optical converting portion is expressed as folows:

$F_1(x)=a_1+b_1x+c_1x^2+d_1x^3$, the input/output transfer function $F_2(x)$ describing the relation between the input electric signal (said second modulation signal) and the output light signal in said external light modulation portion in the state of being supplied with said prescribed bias voltage is expressed as follows:

$F_2(x)=a_2+b_2x+c_2x^2+d_2x^3$, and the ratio of the level $P_1$ of said first modulation signal to the level $P_2$ of said second modulation signal is expressed as follows:

$P_1:P_2=1:m$, the levels $P_1$ and $P_2$ of said first and second modulation signals, the time delay quantity in said delay portion and the bias voltage supplied with said external light modulation portion are set so that the difference $DL_x$ between said delay quantities $DL_1$ and $DL_2$, that is $DL_x=(DL_2-DL_1)$, said "m" and, the coefficients of said input/output transfer functions $F_1(x)$ and $F_2(x)$ satisfy the relation expressed as folows:

$a_1c_2m^2 \cdot \exp\{-2j \cdot 2\pi(DL_x \cdot f)\}$ $+b_1b_2m \cdot \exp\{-j \cdot 2\pi(DL_1 \cdot f)\}+c_1a_2=0$.

24. The optical transmission system according to claim 3, wherein when the delay quantity $DL_1$ of the signal propagation path starting with said signal source and leading to said second optical transmission path through said branch portion, said electrical-optical converting portion, said first optical transmission path and said external light modulation portion, and the delay quantity $DL_2$ of the signal propagation path starting with said signal source and leading to said second optical transmission path through said branch portion, said delay portion and said external light modulation portion are different from each other, the frequency of the electric signal outputted from said signal source is represented by f, the input/output transfer function $F_1(x)$ describing the relation between the input electric signal (said first modulation signal) and the output light signal in said electrical-optical converting portion is expressed as folows:

$F_1(x)=a_1+b_1x+c_1x^2+d_1x^3$, the input/output transfer function $F_2(x)$ describing the relation between the input electric signal (said second modulation signal) and the output light signal in said external light modulation portion in the state of being supplied with said prescribed bias voltage is expressed as follows:

$F_2(x)=a_2+b_2x+c_2x^2+d_2x^3$, and the ratio of the level $P_1$ of said first modulation signal to the level $P_2$ of said second modulation signal is expressed as follows:

$P_1:P_2=1:m$, the levels $P_1$ and $P_2$ of said first and second modulation signals, the time delay quantity in said delay portion and the bias voltage supplied with said external light modulation portion are set so that the difference $DL_x$ between said delay quantities $DL_1$ and $DL_2$, that is $DL_1=(DL_2-DL_1)$, said "m" and, the coefficients of said input/output transfer functions $F_1(x)$ and $F_2(x)$ satisfy the relation expressed as folows:

$a_1c_2m^2 \cdot \exp\{-2j \cdot 2\pi(DL_x \cdot f)\}$ $+b_1b_2m \cdot \exp\{-j \cdot 2\pi(DL_x \cdot f)\}+c_1a_2=0$.

25. The optical transmission system according to claim 1, wherein when the delay quantity $DL_1$ of the signal propagation path starting with said signal source and leading to said second optical transmission path through said branch portion, said electrical-optical converting portion, said first optical transmission path and said external light modulation portion, and the delay quantity $DL_2$ of the signal propagation path starting with said signal source and leading to said second optical transmission path through said branch portion, said delay portion and said external light modulation portion are different from each other, the frequency of the electric signal outputted from said signal source is represented by f, the input/output transfer function $F_1(x)$ describing the relation between the input electric signal (said first modulation signal) and the output light signal in said electrical-optical converting portion is expressed as folows:

$$F_1(x)=a_1+b_1x+c_1x^2+d_1x^3,$$

the input/output transfer function $F_2(x)$ describing the relation between the input electric signal (said second modulation signal) and the output light signal in said external light modulation portion in the state of being supplied with said prescribed bias voltage is expressed as follows:

$$F_2(x)=a_2+b_2x, \text{ and}$$

the ratio of the level $P_1$ of said first modulation signal to the level $P_2$ of said second modulation signal is expressed as follows:

$$P_1:P_2=1:m,$$

the levels $P_1$ and $P_2$ of said first and second modulation signals, the time delay quantity in said delay portion and the bias voltage supplied with said external light modulation portion are set so that the difference $DL_x$ between said delay quantities $DL_1$ and $DL_2$, that is $DL_x=(DL_2-DL_1)$, said "m" and, the coefficients of said input/output transfer functions $F_1(x)$ and $F_2(x)$ satisfy the relation expressed as folows:

$$b_1b_2m\cdot\exp\{-j\cdot 2\pi(DL_x\cdot f)\}+c_1a_2=0.$$

26. The optical transmission system according to claim 2, wherein when the delay quantity $DL_1$ of the signal propagation path starting with said signal source and leading to said second optical transmission path through said branch portion, said electrical-optical converting portion, said first optical transmission path and said external light modulation portion, and the delay quantity $DL_2$ of the signal propagation path starting with said signal source and leading to said second optical transmission path through said branch portion, said delay portion and said external light modulation portion are different from each other, the frequency of the electric signal outputted from said signal source is represented by f, the input/output transfer function $F_1(x)$ describing the relation between the input electric signal (said first modulation signal) and the output light signal in said electrical-optical converting portion is expressed as folows:

$$F_1(x)=a_1+b_1x+c_1x^2+d_1x^3,$$

the input/output transfer function $F_2(x)$ describing the relation between the input electric signal (said second modulation signal) and the output light signal in said external light modulation portion in the state of being supplied with said prescribed bias voltage is expressed as follows:

$$F_2(x)=a_2+b_2x, \text{ and}$$

the ratio of the level $P_1$ of said first modulation signal to the level $P_2$ of said second modulation signal is expressed as follows:

$$P_1:P_2=1:m,$$

the levels $P_1$ and $P_2$ of said first and second modulation signals, the time delay quantity in said delay portion and the bias voltage supplied with said external light modulation portion are set so that the difference $DL_x$ between said delay quantities $DL_1$ and $DL_2$, that is $DL_x=(DL_2-DL_1)$, said "m" and, the coefficients of said input/output transfer functions $F_1(x)$ and $F_2(x)$ satisfy the relation expressed as folows:

$$b_1b_2m\cdot\exp\{-j\cdot 2\pi(DL_x\cdot f)\}+c_1a_2=0.$$

27. The optical transmission system according to claim 3, wherein when the delay quantity $DL_1$ of the signal propagation path starting with said signal source and leading to said second optical transmission path through said branch portion, said electrical-optical converting portion, said first optical transmission path and said external light modulation portion, and the delay quantity $DL_2$ of the signal propagation path starting with said signal source and leading to said second optical transmission path through said branch portion, said delay portion and said external light modulation portion are different from each other, the frequency of the electric signal outputted from said signal source is represented by f, the input/output transfer function $F_1(x)$ describing the relation between the input electric signal (said first modulation signal) and the output light signal in said electrical-optical converting portion is expressed as folows:

$$F_1(x)=a_1+b_1x+c_1x^2+d_1x^3,$$

the input/output transfer function $F_2(x)$ describing the relation between the input electric signal (said second modulation signal) and the output light signal in said external light modulation portion in the state of being supplied with said prescribed bias voltage is expressed as follows:

$$F_2(x)=a_2+b_2x, \text{ and}$$

the ratio of the level $P_1$ of said first modulation signal to the level $P_2$ of said second modulation signal is expressed as follows:

$$P_1:P_2=1:m,$$

the levels $P_1$ and $P_2$ of said first and second modulation signals, the time delay quantity in said delay portion and the bias voltage supplied with said external light modulation portion are set so that the difference $DL_x$ between said delay quantities $DL_1$ and $DL_2$, that is $DL_x=(DL_2-DL_1)$, said "m" and, the coefficients of said input/output transfer functions $F_1(x)$ and $F_2(x)$ satisfy the relation expressed as folows:

$$b_1 b_2 m \cdot \exp\{-j \cdot 2\pi(DL_x \cdot f)\}+c_1 a_2=0.$$

28. The optical transmission system according to claim 2, wherein when the electric signal outputted from said signal source is a frequency division multiplexing signal formed by multiplexing a plurality of carrier waves at different frequencies, and a maximum frequency $f_{max}$ and a minimum frequency $f_{min}$ are set to satisfy:

$$f_{max}<2 \cdot f_{min}$$

in the overall band of the frequency division multiplexing signal, and the maximum frequency $f_{max}$ and the minimum frequency $f_{min}$ in the overall band of the frequency division multiplexing signal and a frequency $f_{local}$ of the output signal in said local oscillation portion are set to satisfy:

$$f_{min}>f_{local}>f_{max}-f_{min},$$

the delay quantity $DL_1$ of the signal propagation path starting with said signal source and leading to said second optical transmission path through said branch portion, said electrical-optical converting portion, said first optical transmission path and said external light modulation portion, and the delay quantity $DL_2$ of the signal propagation path starting with said signal source and leading to said second optical transmission path through said branch portion, said delay portion and said external light modulation portion are set to be equal to each other, the input/output transfer function $F_1(x)$ describing the relation between the input electric signal (said first modulation signal) and the output light signal in said electrical-optical converting portion is expressed as folows:

$$F_1(x)=a_1+b_1 x+c_1 x^2+d_1 x^3,$$

the input/output transfer function $F_2(x)$ describing the relation between the input electric signal (said second modulation signal) and the output light signal in said external light modulation portion in the state of being supplied with said prescribed bias voltage is expressed as follows:

$$F_2(x)=a_2+b_2 x+c_2 x^2+d_2 x^3, \text{ and}$$

the ratio of the level $P_1$ of said first modulation signal to the level $P_2$ of said second modulation signal is expressed as follows:

$$P_1:P_2=1:m,$$

the levels $P_1$ and $P_2$ of said first and second modulation signals, and the bias voltage supplied with said external light modulation portion are set so that said "m" and, the coefficients of said input/output transfer functions $F_1(x)$ and $F_2(x)$ satisfy the relation expressed as folows:

$$a_1 d_2 m^3+b_1 c_2 m^2+c_1 b_2 m+d_1 a_2=0, \text{ and}$$

said filter portion passes only a frequency component lower than said frequency $f_{local}$.

29. The optical transmission system according to claim 3, wherein when the electric signal outputted from said signal source is the frequency division multiplexing signal formed by multiplexing the plurality of carrier waves at different frequencies, and the maximum frequency $f_{max}$ and the minimum frequency $f_{min}$ are set to satisfy:

$$f_{max}<2 \cdot f_{min}$$

in the overall band of the frequency division multiplexing signal, and the maximum frequency $f_{max}$ and the minimum frequency $f_{min}$ in the overall band of the frequency division multiplexing signal and the frequency $f_{local}$ of the output signal in said local oscillation portion are set to satisfy:

$$f_{min}>f_{local}>f_{max}-f_{min},$$

the delay quantity $DL_1$ of the signal propagation path starting with said signal source and leading to said second optical transmission path through said branch portion, said electrical-optical converting portion, said first optical transmission path and said external light modulation portion, and the delay quantity $DL_2$ of the signal propagation path starting with said signal source and leading to said second optical transmission path through said branch portion, said delay portion and said external light modulation portion are set to be equal to each other, the input/output transfer function $F_1(x)$ describing the relation between the input electric signal (said first modulation signal) and the output light signal in said electrical-optical converting portion is expressed as folows:

$$F_1(x)=a_1+b_1 x+c_1 x^2+d_1 x^3,$$

the input/output transfer function $F_2(x)$ describing the relation between the input electric signal (said second modulation signal) and the output light signal in said external light modulation portion in the state of being supplied with said prescribed bias voltage is expressed as follows:

$$F_2(x)=a_2+b_2 x+c_2 x^2+d_2 x^3, \text{ and}$$

the ratio of the level $P_1$ of said first modulation signal to the level $P_2$ of said second modulation signal is expressed as follows:

$$P_1:P_2=1:m,$$

the levels $P_1$ and $P_2$ of said first and second modulation signals, and the bias voltage supplied with said external light modulation portion are set so that said "m" and, the coefficients of said input/output transfer functions $F_1(x)$ and $F_2(x)$ satisfy the relation expressed as folows:

$$a_1 d_2 m^3+b_1 c_2 m^2+c_1 b_2 m+d_1 a_2=0, \text{ and}$$

said filter portion passes only the frequency component lower than said frequency $f_{local}$.

30. The optical transmission system according to claim 2, wherein when the electric signal outputted from said signal source is the frequency division multiplexing signal formed by multiplexing the plurality of carrier waves at different frequencies, and the maximum frequency $f_{max}$ and the minimum frequency $f_{min}$ are set to satisfy:

$f_{max} < 2 \cdot f_{min}$ in the overall band of the frequency division multiplexing signal, and the maximum frequency $f_{max}$ and the minimum frequency $f_{min}$ in the overall band of the frequency division multiplexing signal and the frequency $f_{local}$ of the output signal in said local oscillation portion are set to satisfy:

$f_{min} > f_{local} > f_{max} - f_{min}$,

- the delay quantity $DL_1$ of the signal propagation path starting with said signal source and leading to said second optical transmission path through said branch portion, said electrical-optical converting portion, said first optical transmission path and said external light modulation portion, and the delay quantity $DL_2$ of the signal propagation path starting with said signal source and leading to said second optical transmission path through said branch portion, said delay portion and said external light modulation portion are set to be equal to each other,
- the input/output transfer function $F_1(x)$ describing the relation between the input electric signal (said first modulation signal) and the output light signal in said electrical-optical converting portion is expressed as folows:

$F_1(x) = a_1 + b_1 x + c_1 x^2 + d_1 x^3$,

- the input/output transfer function $F_2(x)$ describing the relation between the input electric signal (said second modulation signal) and the output light signal in said external light modulation portion in the state of being supplied with said prescribed bias voltage is expressed as follows:

$F_2(x) = a_2 + b_2 x$, and

- the ratio of the level $P_1$ of said first modulation signal to the level $P_2$ of said second modulation signal is expressed as follows:

$P_1 : P_2 = 1 : m$,

- the levels $P_1$ and $P_2$ of said first and second modulation signals, and the bias voltage supplied with said external light modulation portion are set so that said "m" and, the coefficients of said input/output transfer functions $F_1(x)$ and $F_2(x)$ satisfy the relation expressed as folows:

$c_1 b_2 m + d_1 a_2 = 0$, and said filter portion passes only the frequency component lower than said frequency $f_{local}$.

31. The optical transmission system according to claim 3, wherein when the electric signal outputted from said signal source is the frequency division multiplexing signal formed by multiplexing the plurality of carrier waves at different frequencies, and the maximum frequency $f_{max}$ and the minimum frequency $f_{min}$ are set to satisfy:

$f_{max} < 2 \cdot f_{min}$ in the overall band of the frequency division multiplexing signal, and the maximum frequency $f_{max}$ and the minimum frequency $f_{min}$ in the overall band of the frequency division multiplexing signal and the frequency $f_{local}$ of the output signal in said local oscillation portion are set to satisfy:

$f_{min} > f_{local} > f_{max} - f_{min}$,

- the delay quantity $DL_1$ of the signal propagation path starting with said signal source and leading to said second optical transmission path through said branch portion, said electrical-optical converting portion, said first optical transmission path and said external light modulation portion, and the delay quantity $DL_2$ of the signal propagation path starting with said signal source and leading to said second optical transmission path through said branch portion, said delay portion and said external light modulation portion are set to be equal to each other,
- the input/output transfer function $F_1(x)$ describing the relation between the input electric signal (said first modulation signal) and the output light signal in said electrical-optical converting portion is expressed as folows:

$F_1(x) = a_1 + b_1 x + c_1 x^2 + d_1 x^3$,

- the input/output transfer function $F_2(x)$ describing the relation between the input electric signal (said second modulation signal) and the output light signal in said external light modulation portion in the state of being supplied with said prescribed bias voltage is expressed as follows:

$F_2(x) = a_2 + b_2 x$, and

- the ratio of the level $P_1$ of said first modulation signal to the level $P_2$ of said second modulation signal is expressed as follows:

$P_1 : P_2 = 1 : m$,

- the levels $P_1$ and $P_2$ of said first and second modulation signals, and the bias voltage supplied with said external light modulation portion are set so that said "m" and, the coefficients of said input/output transfer functions $F_1(x)$ and $F_2(x)$ satisfy the relation expressed as folows:

$c_1 b_2 m + d_1 a_2 = 0$, and said filter portion passes only the frequency component lower than said frequency $f_{local}$.

* * * * *